(12) United States Patent
Yukinobu et al.

(10) Patent No.: US 9,627,680 B2
(45) Date of Patent: Apr. 18, 2017

(54) METHOD FOR PRODUCING SURFACE-TREATED OXIDE PARTICLES, AND OXIDE PARTICLES PRODUCED BY SAID PRODUCTION METHOD

(71) Applicant: SUMITOMO METAL MINING CO., LTD., Tokyo (JP)

(72) Inventors: Masaya Yukinobu, Niihama (JP); Yoshihiro Otsuka, Ichikawa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 15/035,925

(22) PCT Filed: Oct. 31, 2014

(86) PCT No.: PCT/JP2014/079147
§ 371 (c)(1),
(2) Date: May 11, 2016

(87) PCT Pub. No.: WO2015/072359
PCT Pub. Date: May 21, 2015

(65) Prior Publication Data
US 2016/0301063 A1    Oct. 13, 2016

(30) Foreign Application Priority Data

Nov. 15, 2013  (JP) .................................. 2013-236887
May 26, 2014  (JP) .................................. 2014-108044

(51) Int. Cl.
*H01M 4/04*      (2006.01)
*C01G 53/00*     (2006.01)
(Continued)

(52) U.S. Cl.
CPC ............ *H01M 4/049* (2013.01); *C01G 53/42* (2013.01); *C01G 53/50* (2013.01); *H01M 4/366* (2013.01);
(Continued)

(58) Field of Classification Search
None
See application file for complete search history.

(56) References Cited

U.S. PATENT DOCUMENTS

2007/0082265 A1    4/2007  Itou et al.
2009/0162750 A1*   6/2009  Kawakami ............. H01G 11/46
                                                429/218.1
(Continued)

FOREIGN PATENT DOCUMENTS

JP    2003-123755 A    4/2003
JP    2009-266728 A   11/2009
(Continued)

OTHER PUBLICATIONS

Notice of Reasons for Rejection mailed Jun. 23, 2015, issued to JP Application No. 2015-518110.
(Continued)

*Primary Examiner* — Erma Cameron
(74) *Attorney, Agent, or Firm* — Locke Lord LLP

(57) ABSTRACT

Provided is a method for producing surface-treated oxide particles which can be used in an active-material layer for a positive electrode or a negative electrode in a storage battery. Oxide particles in which an alkaline compound is contained in a part or the whole area of the surface of each of the particles are brought into contact with a gas containing a volatile acidic compound to produce a neutralization product by a gas phase reaction, thereby producing surface-treated oxide particles in which the neutralization product is contained. The alkaline compound comprises at least one
(Continued)

compound selected from compounds respectively containing lithium (Li), sodium (Na) and magnesium (Mg), the volatile acidic compound comprises at least one compound selected from compounds respectively containing boron (B), phosphorus (P) and silicon (Si), and the oxide particles comprise an alkali-composited oxide containing at least one transition metal selected from manganese, cobalt, nickel, iron and titanium.

15 Claims, 17 Drawing Sheets

(51) Int. Cl.
  H01M 4/36    (2006.01)
  H01M 4/525   (2010.01)
  H01M 4/62    (2006.01)
  H01M 4/58    (2010.01)
  H01M 10/0525 (2010.01)
  H01M 4/131   (2010.01)

(52) U.S. Cl.
  CPC ......... *H01M 4/525* (2013.01); *H01M 4/5825* (2013.01); *H01M 4/62* (2013.01); *H01M 4/623* (2013.01); *H01M 10/0525* (2013.01); *C01P 2004/61* (2013.01); *C01P 2004/84* (2013.01); *C01P 2006/12* (2013.01); *H01M 4/131* (2013.01); *Y02P 70/54* (2015.11)

(56) References Cited

U.S. PATENT DOCUMENTS

| | | |
|---|---|---|
| 2011/0045348 A1 | 2/2011 | Kubo et al. |
| 2011/0065003 A1* | 3/2011 | Chang ............... H01M 4/505 |
| | | 429/223 |
| 2011/0070488 A1 | 3/2011 | West et al. |
| 2011/0117437 A1 | 5/2011 | Watanabe et al. |
| 2014/0178768 A1 | 6/2014 | Uchiyama et al. |
| 2014/0227606 A1 | 8/2014 | Suzuki et al. |
| 2015/0024280 A1 | 1/2015 | Uchiyama |

FOREIGN PATENT DOCUMENTS

| | | |
|---|---|---|
| JP | 2012-084547 A | 4/2012 |
| JP | 2012-089406 A | 5/2012 |
| JP | 2013-505546 A | 2/2013 |
| JP | 2014-075177 A | 4/2014 |
| WO | WO-2010/125729 A1 | 11/2010 |
| WO | WO-2012160707 A1 | 11/2012 |
| WO | WO-2013/011871 A1 | 1/2013 |
| WO | WO-2013/046443 A1 | 4/2013 |

OTHER PUBLICATIONS

International Search Report mailed Feb. 3, 2015, issued for PCT/JP2014/079147.

Office Action mailed Jun. 23, 2015, issued for the Japanese patent application No. 2015-518110 and English translation thereof.

Decision to Grant a Patent mailed Sep. 15, 2015, issued for the Japanese patent application No. 2015-518110 and English translation thereof.

* cited by examiner

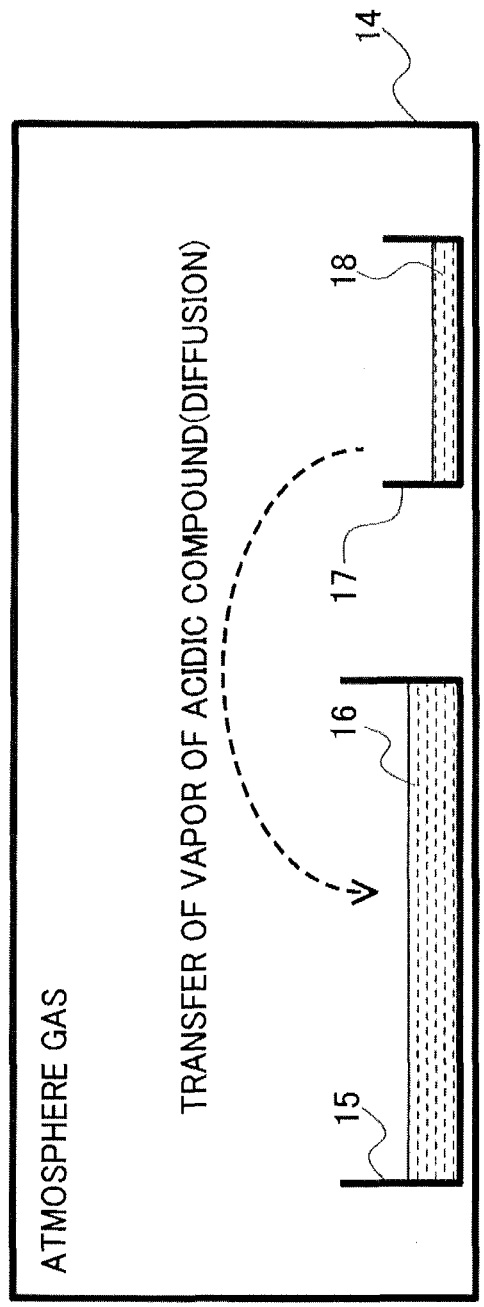

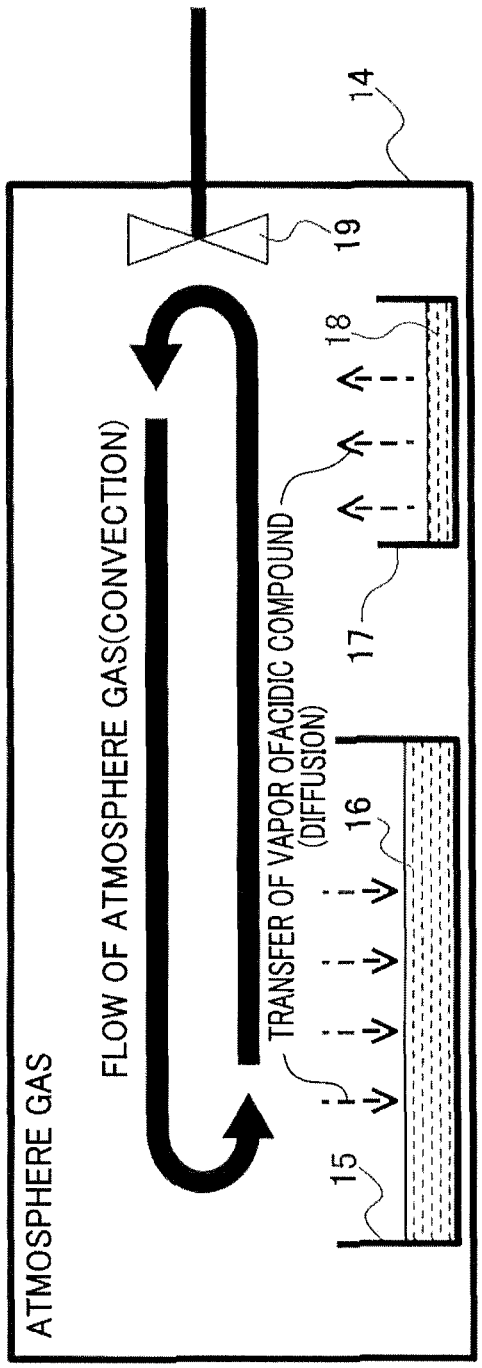

FIG. 13
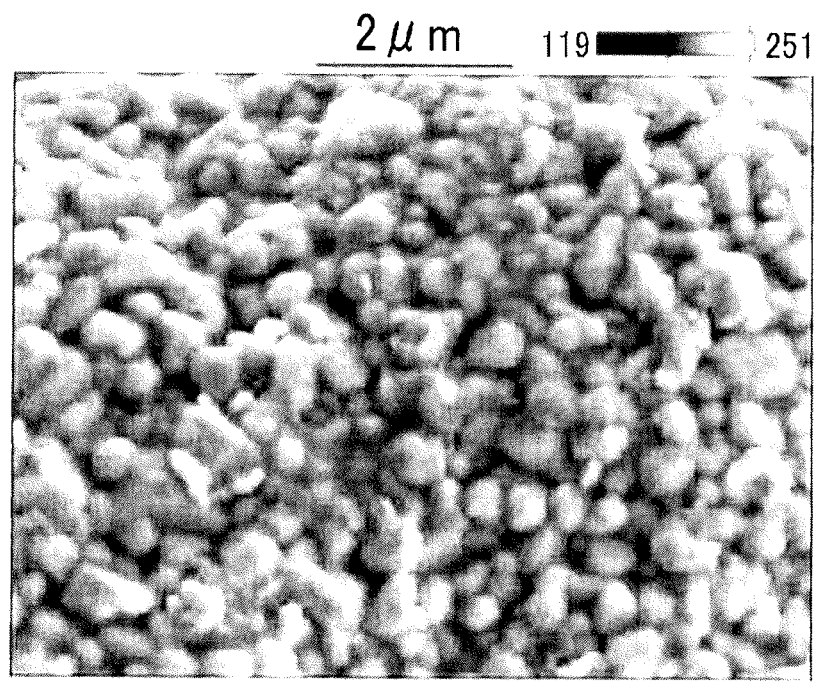
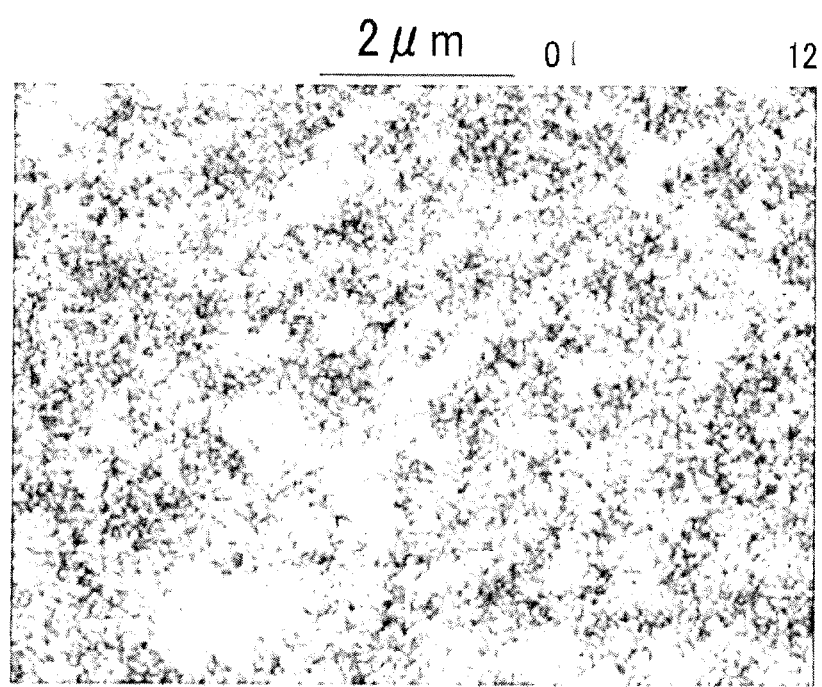

METHOD FOR PRODUCING SURFACE-TREATED OXIDE PARTICLES, AND OXIDE PARTICLES PRODUCED BY SAID PRODUCTION METHOD

TECHNICAL FIELD

The present invention relates to a method of manufacturing surface-treated oxide particles. More specifically, the present invention relates to a method of manufacturing surface-treated oxide particles (a method of surface treatment) which can suitably be used for an active-material layer (positive or negative) of a storage battery (secondary battery) comprising a current collector (positive electrode, negative electrode), a positive-electrode active-material layer, an electrolyte (solid or liquid), and a negative-electrode active-material layer, and is capable of improving various properties of the storage battery, the method being able to be performed by the gas-phase process in a very simple way. The present invention also relates to low-cost and high-performance oxide particles obtained by the above method.

BACKGROUND ART

Lithium-ion secondary batteries as storage batteries (hereinafter, lithium ion batteries), which have a large energy density and excellent charge and discharge cycle characteristics, are widely used mainly for electronic equipment such as portable devices. Here, lithium ion batteries are broadly classified into: (1) electrolyte solution-based lithium ion batteries and (2) all-solid lithium ion batteries according to the type of electrolyte solution to be used.

(1) Electrolyte Solution-Based Lithium Ion Batteries

As shown in FIG. 1, an electrolyte solution-based lithium ion battery, which is the most common lithium ion battery used widely at the present day, comprises the basic elements of a positive electrode (a positive-electrode current collector 1, a positive-electrode active-material layer 2), a negative electrode (a negative-electrode current collector 6, a negative-electrode active-material layer 5), an electrolyte solution 4, and a separator 3. It has a cell structure covered with a container 8 (metal, plastic laminate, and the like) in which the positive electrode and the negative electrode each having an electrode lead 7 (extraction electrode) attached thereto are immersed in the electrolyte solution 4 in a state where the separator 3 capable of retaining an electrolyte between the electrodes is present between the electrodes.

The above positive electrode and the above negative electrode have a structure in which a corresponding active-material layer (the positive-electrode active-material layer 2 or the negative-electrode active-material layer 5) comprising crystalline particles of a corresponding active material (a positive-electrode active material or a negative-electrode active material), an electroconductive auxiliary agent, a binding material (binder) and the like as main components is formed on a corresponding current collector (the positive-electrode current collector 1: aluminum foil and the like, or the negative-electrode current collector 6: a copper foil and the like).

A composite oxide comprising lithium and a transition metal is usually used as the above positive-electrode active material. Specifically, commonly used are lithium cobaltate ($LiCoO_2$), lithium nickelate ($LiNiO_2$), a lithium-nickel-cobalt-aluminum oxide ($Li(Ni—Co—Al)O_2$), a lithium-nickel-manganese-cobalt oxide ($LiNi_{1/3}Mn_{1/3}Co_{1/3}O_2$) as a layered-based material, a lithium-manganese oxide ($LiMn_2O_4$) as a spinel-based material, and lithium iron phosphate ($LiFePO_4$) as an olivine-based material and like. Further, the following are also under development for achieving higher energy: a lithium-manganese-nickel oxide ($Li(Mn_{3/2}Ni_{1/2})O_4$ and the like) as a spinel-based material for performing charge and discharge at a high voltage (in the range of 5 V), a solid solution-based (also referred to as "excess-based") manganese-containing lithium composite oxide (for example, $Li_2MnO_3$—$LiMO_2$ [M:Ni, Mn, Co and the like) as a layered-based material having a high capacity. Moreover, as the above negative-electrode active material, black lead (graphite), lithium titanate ($Li_4Ti_5O_{12}$) and the like are generally used.

Meanwhile, a corresponding active-material layer (the positive-electrode active-material layer 2 or the negative-electrode active-material layer 5) can be formed on a current collector by applying and drying (and press-densifying, if desired) a paste for forming a corresponding active-material layer (a paste for forming a positive-electrode active-material layer or a paste for forming a negative-electrode active-material layer).

Here, as a paste for forming a positive-electrode active-material layer, commonly used is, for example, a nonaqueous paste in which particles of the positive-electrode active material and particles of an electroconductive auxiliary agent such as acetylene black (AB) and vapor-grown carbon fiber (VGCF) are dispersed in an organic solvent such as N-methylpyrrolidone (NMP) in which a binding material (binder) such as poly(vinylidene fluoride) (PVDF) is dissolved. Further, as a paste for forming a negative-electrode active-material layer, commonly used is, for example, an aqueous paste in which particles of the negative-electrode active material and, if desired, particles of an electroconductive auxiliary agent such as acetylene black (AB) and vapor-grown carbon fiber (VGCF) are dispersed in water containing styrene butadiene rubber (SBR), carboxymethyl cellulose (CMC), polyacrylic acid (PAA) and the like as an aqueous binding material (binder).

In the above electrolyte solution-based lithium ion battery, various improvements have been continually made for an active material (a positive-electrode active material and a negative-electrode active material), an electrolyte solution, a separator and the like in order to improve performance thereof and to reduce cost thereof. However, an electrolyte solution-based lithium ion battery using a liquid electrolyte solution as an electrolyte poses a fire risk due to a flammable organic solvent being used as a main component of the electrolyte solution. Further, an electrolyte solution may also leak. Therefore, the electrolyte solution-based lithium ion battery cannot be considered sufficiently safe. Furthermore, the capacity thereof is difficult to increase by increasing voltage because an electrolyte solution usually undergoes decomposition at a cell voltage of about 4.5 V or more. In addition, a smaller and higher-voltage cell is difficult to achieve by using a bipolar layered cell structure because cells in a container (package) are electrically connected to each other via an electrolyte solution. For the above reasons and the like, electrolyte solution-based lithium ion batteries using a liquid electrolyte solution as an electrolyte have limitations for further reducing cost and achieving smaller sizes and better performance. Accordingly, attempts have actively been made in recent years for developing an all-solid lithium ion battery in which a solid electrolyte is used instead of an electrolyte solution.

(2) All-Solid Lithium Ion Battery

An all-solid lithium ion battery, which is characterized in that a nonflammable/flame-retardant solid electrolyte is used instead of an inflammable electrolyte solution, has the following advantages. Leakage of an electrolyte solution from a cell and ignition can be prevented, leading to significantly improved safety. In addition, the above bipolar layered cell structure can allow a package to be thinner/smaller and a higher cell voltage to be obtained by having in-series (layered) connections within a single cell, leading to lower cost. Moreover, a higher capacity can further be achieved by using a positive-electrode active material (the 5-V system) with a high potential versus Li because a potential window of a solid electrolyte can be broadened.

As shown in FIG. 2, the basic cell structure of an all-solid lithium ion battery is a layered cell structure in which current collectors (the positive-electrode current collector 1 and the negative-electrode current collector 6) and functional layers (the positive-electrode active-material layer 2, a solid-electrolyte layer 9, and the negative-electrode active-material layer 5) are layered. By layering two or more of these layered cell structures, a bipolar layered cell structure can easily be obtained (n layers: a current collector/a positive-electrode active-material layer (first layer)/a solid-electrolyte layer (first layer)/a negative-electrode active-material layer (first layer)/a current collector/a positive-electrode active-material layer (second layer)/a solid-electrolyte layer (second layer)/a negative-electrode active-material layer (second layer)/a current collector/ . . . /a positive-electrode active-material layer ($n^{th}$ layer)/a solid electrolyte layer ($n^{th}$ layer)/a negative-electrode active-material layer ($n^{th}$ layer)/a current collector). The electrode lead 7 (extraction electrode) is attached to each of the outermost current collectors of the layered cell structure (the positive-electrode current collector 1, the negative-electrode current collector 6), and covered with the container 8 (a metal, a laminated plastic and the like). As the above current collector, a stainless steel foil, an aluminum foil, or the like can be used for the positive-electrode current collector 1, and a stainless steel foil, a copper foil, or the like can be used for the negative-electrode current collector 6.

Further, in the above functional layers (the positive-electrode active-material layer 2, the solid-electrolyte layer 9, and the negative-electrode active-material layer 5), in an active-material layer (the positive-electrode active-material layer 2 or the negative-electrode active-material layer 5) for example, crystalline particles of a corresponding active material (a positive-electrode active material or a negative-electrode active material) are dispersed in a solid electrolyte matrix, and a trace amount of an electroconductive auxiliary agent for improving current-collecting properties (electron conductivity) within the active-material layer and a binding material (binder) for conferring adhesiveness and plasticity may be contained if desired. Moreover, the solid-electrolyte layer 9 is a polycrystalline layer in which solid-electrolyte particles are densely packed, or is a dense noncrystalline layer consisting of the solid electrolyte, and may comprise a trace amount of a binding material (binder) for conferring adhesiveness and plasticity, if desired.

For the above active materials (positive-electrode active material, negative-electrode active material), materials similar to those for active materials used in the aforementioned electrolyte solution-based lithium ion battery can be used. Furthermore, advantageously, a high-capacity negative-electrode active material such as metal lithium or various lithium alloys, which cannot be used for an electrolyte solution-based lithium ion battery because metal lithium undergoes dendrite deposition at a negative electrode and causes short circuiting, can also be used for an all-solid lithium ion battery.

Incidentally, solid electrolytes used for all-solid lithium ion batteries can be broadly classified into oxide-based solid electrolytes and sulfide-based solid electrolytes. For example, oxide-based solid electrolytes include lithium phosphate ($Li_3PO_4$), $Li_3PO_4N_x$ in which nitrogen is added to lithium phosphate (referred to as LiPON), $LiBO_2N_x$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—ZnO, $Li_{1+X}Al_XTi_{2-X}(PO_4)_3$ (0≤X≤1) (referred to as LATP or LTAP), $Li_{1+X}Al_XG_{2-X}(PO_4)_3$ (0≤X≤1; specifically $Li_{1.5}Al_{0.5}Ge_{1.5}(PO_4)_3$) (referred to as LAGP), $LiTi_2(PO_4)_3$, $Li_{3X}La_{2/3-X}TiO_3$ (0≤X≤⅔; specifically $Li_{0.33}La_{0.56}TiO_3$, $Li_{0.5}La_{0.5}TiO_3$ and the like) (referred to as LLT or LLTO), $Li_5La_3Ta_2O_{12}$, $Li_7La_3Zr_2O_{12}$ (referred to as LLZ or LLZO), $Li_6BaLa_2Ta_2O_{12}$, $Li_{3.6}Si_{0.6}P_{0.4}O_4$ and the like. Sulfide-based solid electrolytes include $Li_2S$—$SiS_2$, LiI—$Li_2S$—$SiS_2$, LiI—$Li_2S$—$P_2S_5$, LiI—$Li_2S$—$B_2S_3$, $Li_3PO_4$—$Li_2S$—$Si_2S$, $Li_3PO_4$—$Li_2S$—$SiS_2$, $LiPO_4$—$Li_2S$—SiS, LiI—$Li_2S$—$P_2O_5$, LiI—$Li_3PO_4$—$P_2S_5$, $Li_2S$—$P_2S_5$ and the like. However, sulfide-based solid electrolytes, which have a higher conductivity for lithium ions than oxide-based solid electrolytes, are preferable. Among these, an $Li_2S$—$P_2S_5$-based solid electrolyte is preferred in view of excellent properties and cost reduction (expensive metal elements are not included).

It is known that when oxide particles having excellent electron conductivity (for example, lithium cobaltate ($LiCoO_2$), lithium nickelate ($LiNiO_2$), a lithium-nickel-cobalt-aluminum oxide ($Li(Ni$—Co—$Al)O_2$), a lithium-nickel-manganese-cobalt oxide ($LiNi_{1/3}Mn_{1/3}Co_{1/3}O_2$ and the like), oxide particles having moderate electron conductivity (a lithium-manganese-nickel oxide ($Li(Mn_{3/2}Ni_{1/2})O_4$ and the like), a solid solution-based (excess-based) manganese-containing lithium composite oxide ($Li_2MnO_3$—$LiMO_2$ [M:Ni, Mn, Co] and the like)) are used as an active material for an all-solid lithium ion battery in which the above sulfide-based solid electrolytes are used, a lithium ion-deficient space-charge layer is formed in the side of the sulfide-based solid electrolyte at the interface of the active-material particles (oxide particles) and the sulfide-based solid electrolyte in an active-material layer, resulting in significantly deteriorated output characteristics (rate characteristics) of a battery due to significantly increased resistance at the interface. Accordingly, as a method of effectively reducing interface resistance, a coating of active-material particles (oxide particles) with an oxide solid electrolyte having low electron conductivity (for example, an alkali composite oxide such as $Li_2SiO_3$, $LiNbO_3$, $Li_4Ti_5O_{12}$, $Li_2Ti_2O_5$ and the like) is proposed and widely tested (see Patent Literatures 1 to 3 and the like).

Although lithium ion batteries as storage batteries are described above, attempts have actively been made in recent years at developing a low-cost next-generation battery with a higher capacity (the next generation secondary battery) as a storage battery, for example a sodium ion battery or a magnesium ion battery. Even in these batteries, basic structures thereof are similar to those of the aforementioned lithium ion batteries, but sodium or magnesium is used instead of lithium.

Patent Document 1: Japanese Unexamined Patent Application, Publication No. 2009-266728
Patent Document 2: Pamphlet of PCT International Publication No. WO2013/011871
Patent Document 3: Pamphlet of PCT International Publication No. WO2013/046443

DISCLOSURE OF THE INVENTION

Problems to be Solved by the Invention

In the above electrolyte solution-based lithium ion batteries, a composition with excess lithium is often required in order to achieve a high capacity of positive-electrode active-material particles used in the batteries. In such cases, disadvantageously, a paste for forming a positive-electrode active-material layer tends to undergo gelation (pudding formation). As a method of suppressing this gelation (pudding formation), for example, a method is proposed comprising washing positive-electrode active-material particles containing excess lithium in pure water to remove excess lithium on the surfaces of the positive-electrode active-material particles. Further, various coatings on the positive-electrode active-material particles described above are known to be effective.

Meanwhile, even in the case of all-solid lithium ion batteries, the aforementioned problem of increased interface resistance between positive-electrode active-material particles and a sulfide-based solid electrolyte has become obvious. Coating of positive-electrode active-material particles with an oxide solid electrolyte (an alkali composite oxide) is also known to be effective in order to reduce this interface resistance.

While surface coating active-material particles is effective, as described above, when conventional wet coating methods are used, such as those using a tumbling fluidized bed device for example, the coating thickness and coating quality are difficult to control and expensive equipment and complicated processes are required, resulting in higher cost. Therefore, a manufacturing method has been desired in which coating with an oxide solid electrolyte (an alkali composite oxide) of oxide particles as an active material (a positive-electrode active material, a negative-electrode active material) is performed more simply and at a lower cost.

An object of the present invention is to provide a method of manufacturing surface-treated oxide particles in an extremely simple way by the gas phase process in order to manufacture oxide particles for an active material of a storage battery and the like which are capable of improving various properties of the storage battery.

Means for Solving the Problems

After conducting extensive studies in view of these circumstances, the present inventors find that high-performance surface-treated oxide particles can be manufactured at low cost by contacting oxide particles having an alkaline compound on some or all particle surfaces with a gas comprising a volatile acidic compound, and forming a neutralization product by a reaction of the alkaline compound with the acidic compound in the gas phase to obtain oxide particles having the neutralization product on some or all of the surfaces thereof.

That is, a first embodiment of the present invention is a method of manufacturing surface-treated oxide particles, the method comprising: contacting oxide particles having an alkaline compound on some or all of particle surfaces with a gas comprising a volatile acidic compound, and forming a neutralization product by a reaction of the alkaline compound with the acidic compound in the gas phase to obtain oxide particles having the neutralization product on some or all of the particle surfaces,
wherein the alkaline compound is any one or more selected from the group of compounds containing lithium (Li), sodium (Na), and magnesium (Mg), and the volatile acidic compound is any one or more selected from the group of compounds containing boron (B), phosphorus (P), and silicon (Si), and
the oxide particles are of an alkali composite oxide comprising any one or more transition metals selected from the group of manganese, cobalt, nickel, iron, and titanium, and comprising any one or more alkali elements selected from the group of lithium (Li), sodium (Na), and magnesium (Mg).

A second embodiment of the present invention is the method of manufacturing surface-treated oxide particles, wherein the volatile acidic compound in the first embodiment contains boron (B), and the content of boron (B) relative to the surface-treated oxide particles is 0.01 mass % or more and 0.10 mass % or less.

A third embodiment of the present invention is the method of manufacturing surface-treated oxide particles, wherein the volatile acidic compound in the first or second embodiment contains phosphorus (P), and the content of phosphorus (P) relative to the surface-treated oxide particles is 0.01 mass % or more and 0.10 mass % or less.

A fourth embodiment of the present invention is the method of manufacturing surface-treated oxide particles, wherein the volatile acidic compound in any one of the first to third embodiments contains silicon (Si), and the content of silicon (Si) relative to the surface-treated oxide particles is 0.05 mass % or more and 0.30 mass % or less.

A fifth embodiment of the present invention is the method of manufacturing surface-treated oxide particles, wherein the oxide particles having an alkaline compound on some or all of particle surfaces in any one of the first to fourth embodiments are oxide particles having some or all of particle surfaces coated with an alkali component, and the alkali component is any one or more selected from the group of hydroxides, carbonates, and oxides of lithium (Li), sodium (Na), and magnesium (Mg).

A sixth embodiment of the present invention is the method of manufacturing surface-treated oxide particles, wherein the alkali component in the fifth embodiment is any one or more selected from the group of lithium hydroxide (LiOH), lithium carbonate ($Li_2CO_3$), and lithium oxide ($Li_2O$).

A seventh embodiment of the present invention is the method of manufacturing surface-treated oxide particles, wherein the alkaline compound in the first embodiment is an alkali composite oxide, the alkali composite oxide containing one or more alkali oxides selected from the group of oxides of lithium (Li), sodium (Na), and magnesium (Mg) in an excess amount as compared to a stoichiometric composition.

An eighth embodiment of the present invention is the method of manufacturing surface-treated oxide particles, wherein the volatile acidic compound in any one of the first to seventh embodiments is any one or more selected from the group of boric acid compounds, phosphoric acid compounds, phosphorous acid compounds, and silicic acid compounds each having a boiling point of 300° C. or less.

A ninth embodiment of the present invention is the method of manufacturing surface-treated oxide particles, wherein the volatile acidic compound in the eighth embodiment is any one or more selected from the group of alkylboric acid, alkylphosphoric acid, alkylphosphorous acid, and alkylsilicic acid each having a boiling point of 250° C. or less.

A tenth embodiment of the present invention is the method of manufacturing surface-treated oxide particles, comprising: performing heat treatment at 100° C. or more after forming the neutralization product in any of the first to ninth embodiments.

An eleventh embodiment of the present invention is the method of manufacturing surface-treated oxide particles, wherein the neutralization product in any one of the first to tenth embodiments is any one or more selected from the group of lithium boron oxides, lithium phosphorus oxides, and lithium silicon oxides.

A twelfth embodiment of the present invention is the method of manufacturing surface-treated oxide particles, wherein the alkali composite oxide in any one of the first to eleventh embodiments comprises, as a main component, any one or more selected from the group of $LiMO_2$, $LiMPO_4$, $Li_2MSiO_4$ (M: any one or more transition metals selected from the group of manganese, cobalt, nickel, and iron), $LiY_aMn_{2-a}O_4$ (Y: cobalt, nickel; $0 \leq a \leq 1$), $Li_2MnO_3$—$LiMO_2$ (M: any one or more transition metals selected from the group of manganese, cobalt, and nickel), and $Li_4Ti_5O_{12}$.

A thirteenth embodiment of the present invention is oxide particles obtained by the method of manufacturing oxide particles according to any one of the first to twelfth embodiments, wherein the oxide particles each comprises a secondary particle formed with primary particles, and the neutralization product is formed on a surface of the secondary particle and on a surface exposed to the side of an open pore between the primary particles, the surface exposed to the side of an open pore between the primary particles being a portion of surfaces of the primary particles inside the secondary particle.

Effects of the Invention

The method of manufacturing surface-treated oxide particles according to the present invention is a gas phase process in which a gas containing a volatile acidic compound is brought into contact with oxide particles having an alkaline compound. Therefore, a neutralization product can be formed on the surfaces of oxide particles in a simple manner, and high-performance surface-treated oxide particles can be manufactured at low cost.

A dense surface-treatment layer is formed on each of the surface-treated oxide particles according to the present invention in an extremely simple manner by a manufacturing method called the gas phase process. For example, the gelation of a paste for forming an active-material layer (an active-material paste) in an electrolyte solution-based secondary battery can be inhibited by alkali neutralization of surfaces of the oxide particles, and the interface resistance at active-material particles/a sulfide-based solid electrolyte in a sulfide-based all-solid secondary battery can be reduced. Therefore, the present invention is suitable for an (positive electrode or negative electrode) active-material layer in an electrolyte solution-based secondary battery or an all-solid secondary battery, and significantly contributes to provision of a low-cost secondary battery with improved properties.

BRIEF DESCRIPTION OF THE DRAWINGS

FIG. 4 is a schematic diagram illustrating an example of the method of manufacturing surface-treated oxide particles by the gas phase process using a volatile acidic compound according to the present invention.

FIG. 5 is a schematic diagram illustrating another example of the method of manufacturing surface-treated oxide particles by the gas phase process using a volatile acidic compound according to the present invention.

FIG. 13 shows a scanning electron microscope image (SEM image) of surface-treated oxide particles (secondary particles) according to Example 5 of the present invention configured such that primary particles are assembled in an agglomerative form and each having a surface-treated layer formed by the gas phase process (top panel), and the distribution of silicon (Si) in the surface-treated layers by the energy dispersive X-ray analysis (EDS analysis) in the same field (bottom panel).

PREFERRED MODE FOR CARRYING OUT THE INVENTION

Figure 1:
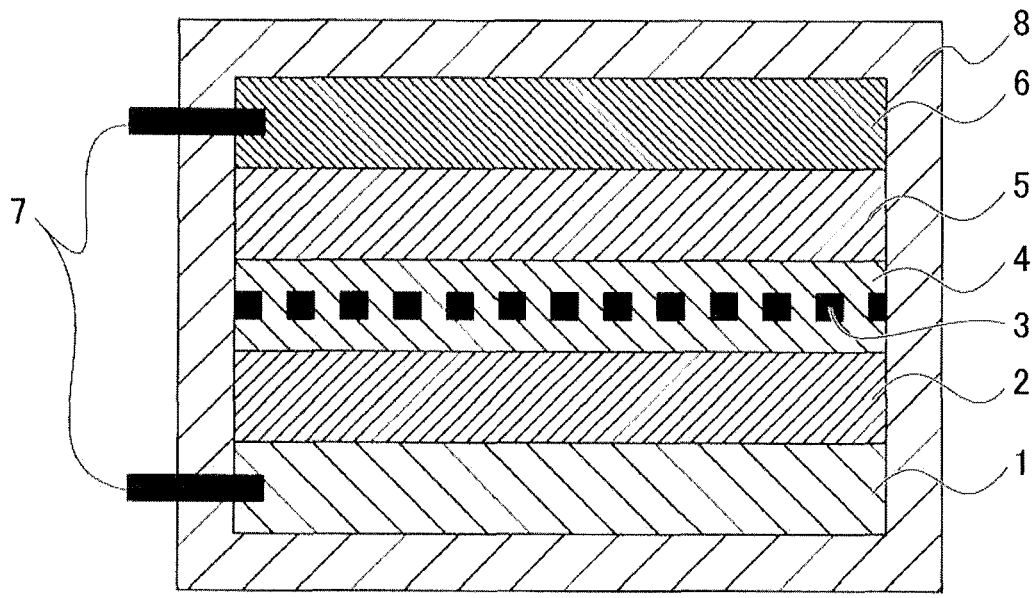
FIG. 1 is a schematic diagram illustrating an example of the structure of an electrolyte solution-based lithium ion battery.
Figure 2:
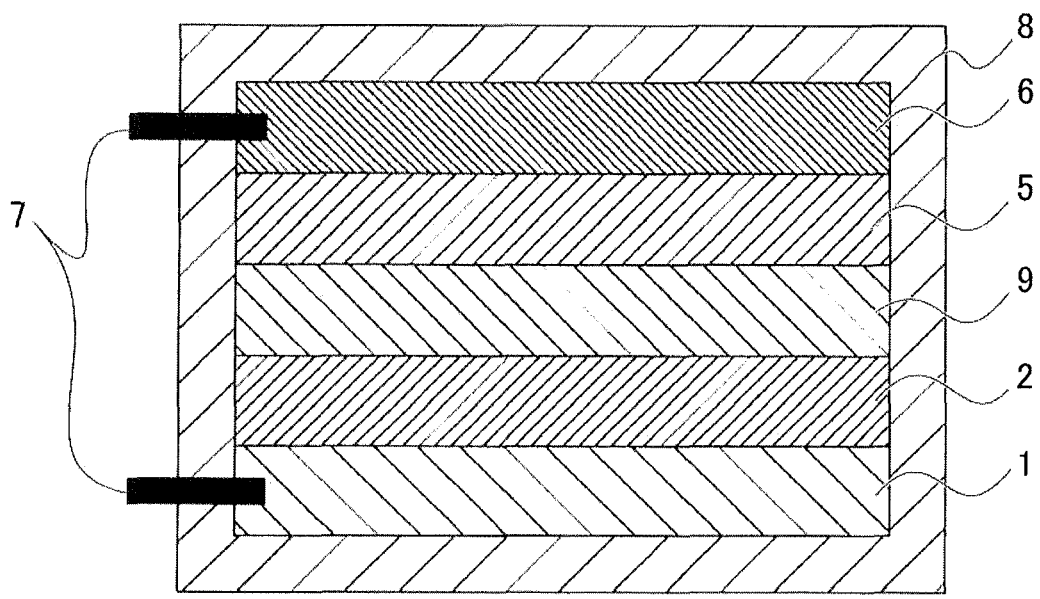
FIG. 2 is a schematic diagram illustrating an example of the structure of an all-solid lithium ion battery.

Below, embodiments of the present invention will be described in detail. In the method of manufacturing surface-treated oxide particles according to the present invention, a dense neutralization product can easily be formed on surfaces of oxide particles by performing surface treatment on the particles by the gas phase process by contacting the oxide particles having an alkaline compound on some or all of particle surfaces with a gas comprising a volatile acidic compound. This allows high-performance surface-treated oxide particles to be manufactured at low cost.

In addition, the above surface-treated oxide particles are for example, capable of suppressing the gelation of an active-material paste of an electrolyte solution-based secondary battery, by alkali neutralization of surfaces of the oxide particles, and also capable of reducing interface resistance at an interface between active-material particles/a sulfide-based solid electrolyte in a sulfide-based all-solid secondary battery. Therefore, they are suitable for an (positive electrode or negative electrode) active-material layer for electrolyte solution-based secondary batteries and all-solid secondary batteries.

[Oxide Particles Having an Alkaline Compound on Some or all of Particle Surfaces]

First, oxide particles to be used in the present invention before surface treatment will be described. Oxide particles to be used in the present invention are those having an alkaline compound on some or all of particle surfaces. Oxide particles include those for positive-electrode active materials and those for negative-electrode active materials when broadly classified. Below, these will be described specifically.

(a) Oxide Particles for Positive-Electrode Active Materials

A positive-electrode active material for use in, for example, a lithium ion battery, may be any substance as long as it can easily release and adsorb lithium ions so that more lithium ions can be released and occluded. The following can be used: lithium-cobalt oxides ($LiCoO_2$ [lithium cobaltate], $LiCo_2O_4$ and the like) (referred to as LCO), lithium-nickel oxides ($LiNiO_2$ [lithium nickelate], $LiNi_2O_4$ and the like) (referred to as LNO), lithium-manganese oxides ($LiMnO_2$ [lithium manganate], $LiMn_2O_4$, $Li_2Mn_2O_4$ and the like) (referred to as LMO), lithium-manganese-cobalt oxides ($LiMnCoO_4$, $Li_2MnCoO_4$ and the like), lithium-nickel-manganese-cobalt oxides (Li(Ni—Mn—Co)$O_2$, $LiNi_{1/3}Mn_{1/3}Co_{1/3}O_2$ and the like) (referred to as NMC or NCM), lithium-nickel-cobalt-aluminum oxides (Li(Ni—Co—Al)$O_2$, $LiNi_{0.8}Co_{0.15}Al_{0.05}O_2$ and the like) (referred to as NCA), lithium-manganese-nickel oxides ($Li(Mn_{3/2}Ni_{1/2})O_4$ and the like), solid solution-based (excess-based) manganese-containing lithium composite oxides (for example, $Li_2MnO_3$—$LiMO_2$ [M:Ni, Mn, Co and the like]), lithium-titanium oxides ($Li_4Ti_5O_{12}$, $LiTi_2O_4$ and the like) (referred to as LTO), lithium oxides containing another transition metal(s) ($Li_2CuO_2$, $LiCuO_2$, $LiVO_2$, $LiV_2O_4$, $LiCrO_2$, $LiFeO_2$, $LiTiO_2$, $LiScO_2$, $LiYO_2$, $LiMnCrO_4$, $LiNiVO_4$, $LiCoVO_4$ and the like), lithium-phosphates containing a transition metal(s) ($LiFePO_4$ [lithium iron phosphate] (referred to as LFP), $LiCuPO_4$, $LiNiPO_4$, $LiCoPO_4$, $LiMnPO_4$, $Li_2NiPO_4F$, $Li_2CoPO_4F$, $Li_2MnPO_4F$, $Li_2FePO_4F$, $LiVOPO_4$, $Li_3V_2(PO_4)_3$ and the like), lithium silicates containing a transition metal(s) ($Li_2MnSiO_4$, $Li_2FeSiO_4$, $Li_2CoSiO_4$, $Li_2NiSiO_4$ and the like), sulfides of a transition metal(s) ($TiS_2$, $MoS_2$, $FeS$, $FeS_2$, $CuS$, $Ni_3S_2$), oxides of a transition metal(s) ($Bi_2O_3$, $Bi_2Pb_2O_5$, $CuO$, $V_2O_5$, $V_6O_{13}$, $Nb_2O_5$ and the like) and the like. Further, these may be used in combination.

Further, for example, for use in sodium ion batteries, any substance may be used as long as it can easily release and adsorb sodium ions so that more sodium ions can be released and occluded. The following can be used: sodium-iron oxides ($Na_xFeO_2$; $2/3 \le X \le 1$), sodium-nickel-manganese oxides ($Na_x(Ni—Mn)O_2$; $2/3 \le X \le 1$, $Na_{0.67}Ni_{0.5}Mn_{0.5}O_2$, $NaNi_{0.5}Mn_{0.5}O_2$ and the like), sodium-iron-manganese-nickel oxides (Na(Fe—Mn—Ni)$O_2$. $NaFe_{0.4}Mn_{0.3}Ni_{0.3}O_2$ and the like), sodium phosphates containing a transition metal(s) ($NaFePO_4$, $Na_2FeP_2O_7$, $Na_4M_3(PO_4)_2P_2O_7$ [M:Mn, Co, Ni] and the like) and the like. Further, these may be used in combination.

Here, there is no clear distinction between positive-electrode active materials and negative-electrode active materials. When the charge and discharge potentials of two different compounds are compared, one showing a higher potential can be used as a positive-electrode active material while the other showing a lower potential can be used as a negative-electrode active material.

Among the aforementioned various positive-electrode active materials, the following are preferred and commonly used for lithium ion batteries: lithium cobaltate ($LiCoO_2$), lithium nickelate ($LiNiO_2$), lithium-nickel-cobalt-aluminum oxides (Li(Ni—Co—Al)$O_2$ and the like), lithium-nickel-manganese-cobalt oxides ($LiNi_{1/3}Mn_{1/3}Co_{1/3}O_2$) as a layered-based material, lithium-manganese oxide ($LiMn_2O_4$) as a spinel-based material, and lithium iron phosphate ($LiFePO_4$) as an olivine-based material and the like. Furthermore, the following can also be used suitably: lithium-manganese-nickel oxides ($Li(Mn_{3/2}Ni_{1/2})O_4$ and the like) as spinel-based materials under development for achieving higher energy, in which charge and discharge are performed at a high voltage (at a range of 5 V); and solid solution-based (also referred to as "excess-based") manganese-containing lithium composite oxides (for example, $Li_2MnO_3$—$LiMO_2$ [M: Ni, Mn, Co and the like]) as layered-based materials having a high-capacity.

(b) Oxide Particles for Negative-Electrode Active Materials

As described above, there is no clear distinction between negative-electrode active materials and positive-electrode active materials. For example, for use in lithium ion batteries, a material for forming a negative-electrode active material can be any substance as long as it can easily release and adsorb lithium ions so that more lithium ions can be released and occluded. The following can be used: for example, lithium-titanium oxides ($Li_4Ti_5O_{12}$, $LiTi_2O_4$ and the like), lithium-titanium-niobium oxides ($Li_4(Ti_2Nb_3)O_{12}$ and the like), various metal oxides ($Nb_2O_5$, $V_2O_5$, $NiO$, $In_2O_3$, $SnO_2$, $ZnO$, $TiO_2$ and the like) and the like. Further, these may be used in combination. Among the aforementioned various oxide particles for negative-electrode active materials, lithium-titanate ($Li_4Ti_5O_{12}$) and the like are widely used.

Further, for example, for use in sodium ion batteries, any substance may be used as long as it can easily release and adsorb sodium ions so that more sodium ions can be released and occluded. The following can be used: sodium-titanium oxides ($Na_2Ti_3O_7$ and the like), metal oxides ($SnO_2$ and the like) and the like.

In the present invention, the following can be used as oxide particles having an alkaline compound on some or all of particle surfaces: (1) oxide particles in which some or all of particle surfaces are coated with one or more selected from the group of hydroxides, carbonates, oxides of lithium (Li), sodium (Na), magnesium (Mg) (for example, lithium hydroxide (LiOH), lithium carbonate ($Li_2CO_3$), lithium oxide ($Li_2O$) and the like; and (2) oxide particles of an alkali composite oxide in which one or more alkali oxides selected from the group of oxides of lithium (Li), sodium (Na), magnesium (Mg) are excessively contained as compared with the stoichiometric composition (for example, an oxide which contains excess lithium in a positive-electrode active material such as the aforementioned LNO, NCA, NMC and the like, a solid solution-based (excess-based) manganese-containing lithium composite oxide and the like). The latter (2) is preferred because the amount of an alkaline compound present on the surfaces of oxide particles is spontaneously increased to promote neutralization reactions on the surfaces of the oxide particles, enabling more uniform surface treatment even though an alkali coating is not applied as in the former (1).

Note that in a case where, for example, a lithium composite oxide is used as an alkali composite oxide in which an alkali oxide described above is excessively contained as compared with the stoichiometric composition, an excess lithium oxide (an alkaline compound) on the surfaces of the oxide particles may make contact with the moisture in the air (even if very little) during handling of the oxide particles, and thus it is well conceivable that a portion or all of the excess lithium oxide may be converted into lithium hydroxide (an alkaline compound) ($LiO_{0.5}+0.5H_2O \rightarrow LiOH$). Of course, alkaline compounds used in the present invention include the aforementioned alkaline compounds.

[Volatile Acidic Compounds]

Next, volatile acidic compounds will be described. The volatile acidic compound used in the present invention refers to a compound, a vapor of which reacts with an alkaline compound present on the surfaces of the above oxide particles in the gas phase, and needs to be any one or more selected from the group of compounds containing boron (B), phosphorus (P), silicon (Si). The volatile acidic compound used in the present invention is preferably any one or more selected from the group of boric acid compounds, phosphoric acid compounds, phosphorous acid compounds, silicic acid compounds each having a boiling point of 300° C. or less, and more preferably any one or more selected from the group of alkyl boric acid, alkyl phosphoric acid, alkyl phosphorous acid, alkyl silicic acid each having a boiling point of 250° C. or less.

More specific examples include trimethyl borate (trimethoxyborane) [$B(OCH_3)_3$] (boiling point: 68° C., melting point: −34° C., flash point: −8° C., Category IV, Class I Petroleum, water-insoluble), triethyl borate (triethoxyborane) [$B(OC_2H_0_3)$] (boiling point: 120° C., melting point: −84.8° C., flash point: 11.1° C., Category IV, Class II Petroleum, water-insoluble), trimethyl phosphite (trimethoxyphosphine) [$P(OCH_3)_3$] (boiling point: 111° C., melting point: −75° C., flash point: 28° C., Category IV, Class II Petroleum, water-insoluble), trimethyl phosphate (trimethoxyphosphine oxide) [$P(O)(OCH_3)_3$] (boiling point: 197° C., melting point: −46° C., flash point: 94° C., Category IV, Class III Petroleum, water-soluble), triethyl phosphate (triethoxyphosphine oxide) [$P(O)(OC_2H_0_3)$] (boiling point: 215° C., melting point: −56° C., flash point: 116° C., Category IV, Class III Petroleum, water-soluble), dimethyl phosphate (dimethyl phosphate) [$P(O)(OH)(OCH_3)_2$] (boiling point: 174° C., flash point: 50° C., Category IV, Class III Petroleum, water-soluble) tetramethyl orthosilicate (tetramethoxysilane) [$Si(OCH_3)_4$] (boiling point: 122° C., melting point: −4° C., flash point: 29° C., toxic), tetraethyl orthosilicate (tetraethoxysilane) [$Si(OC_2H_5)_4$] (boiling point: 165° C., melting point: −82° C., flash point: 54° C., Category IV, Class II Petroleum, Hazard Rating III, water-insoluble), trimethoxymethylsilane [$Si(CH_3)(OCH_3)_3$] (boiling point: 103° C., melting point: −70° C., flash point: 13° C., Category IV, Class I Petroleum, Hazard Rating II, water-insoluble), dimethoxydimethylsilane [$Si(CH_3)_2(OCH_3)_2$] (boiling point: 81° C., melting point: −80° C., flash point: −5° C., Category IV, Class I Petroleum, Hazard Rating II, water-insoluble) and the like. Among these, particularly preferred are trimethyl borate (trimethoxyborane), triethyl borate (triethoxyborane), trimethyl phosphite (trimethoxyphosphine), tetraethyl orthosilicate (tetraethoxysilane), which have relatively high volatility (a relatively low boiling point), and are less hazardous/toxic.

Further, a volatile acidic compound containing boron (B) in which the content of boron (B) is 0.01 mass % or more and 0.10 mass % or less relative to the surface-treated oxide particles is preferred because the improvement in the stability of a paste for forming a positive-electrode active-material layer (inhibition of gelation), for example, can be achieved without impairing battery properties when used in the paste for forming an active-material layer of an electrolyte solution-based secondary battery.

Furthermore, a volatile acidic compound containing phosphorus (P) in which the content of phosphorus (P) is 0.01 mass % or more and 0.10 mass % or less relative to the surface-treated oxide particles is preferred because the improvement in the stability of a paste for forming a positive-electrode active-material layer (inhibition of gelation) for example, can be achieved without impairing battery properties when used in the paste for forming an active-material layer of an electrolyte solution-based secondary battery.

Moreover, a volatile acidic compound containing silicon (Si) in which the content of silicon (Si) is 0.05 mass % or more and 0.30 mass % or less relative to the surface-treated oxide particles is preferred because the improvement in the stability of a paste for forming a positive-electrode active-material layer (inhibition of gelation), for example, can be achieved without impairing battery properties when used in the paste for forming an active-material layer of an electrolyte solution-based secondary battery.

Note that the volatile acidic compound used in the present invention is not limited to the aforementioned compounds as long as a vapor of it reacts with an alkaline compound present on the surfaces of the above oxide particles in the gas phase. Further, it may be an acidic compound containing an element other than boron (B), phosphorus (P), silicon (Si).

[Method of Manufacturing Surface-Treated Oxide Particles]

The method of manufacturing surface-treated oxide particles according to the present invention will be described in detail. In the method of manufacturing surface-treated oxide particles according to the present invention, a neutralization product is formed by the gas phase process in which the aforementioned oxide particles having an alkaline compound on some or all of particle surfaces is brought into contact with a vapor of the above volatile acidic compound, and the vapor of the above volatile acidic compound is allowed to react selectively or preferentially with a portion of the alkaline compound on the particle surface.

As described above, unlike the liquid phase process (the wet process) in which a coating layer is formed on particle surfaces in a liquid, the gas phase process is used in the manufacturing method according to the present invention, and a uniform surface-treatment layer can be formed on the surfaces of oxide particles at the nano level, for example, with a thickness of about 3 to 100 nm.

Figure 3A:
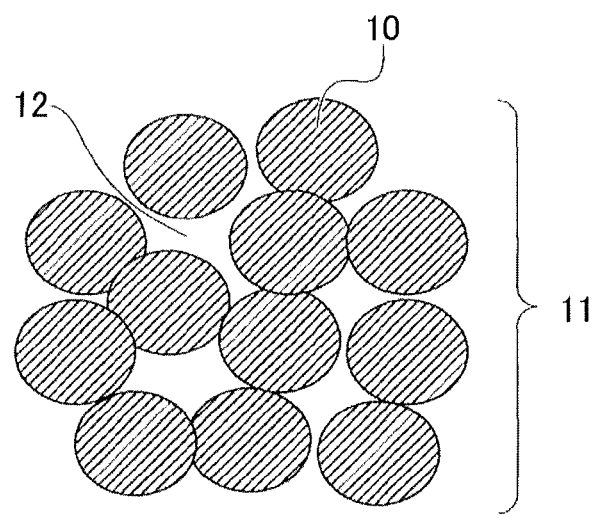
FIG. 3 shows oxide particles; (a) a schematic diagram of a secondary particle configured such that primary particles are assembled in an agglomerative form; (b) a schematic diagram of an oxide particle (a secondary particle) configured such that primary particles are assembled in an agglomerative form and having a coating layer formed by the liquid phase process (the wet process); (c) a schematic diagram of a surface-treated oxide particle (a secondary particle) according to the present invention configured such that primary particles are assembled in an agglomerative form and having a surface-treated layer formed by the gas phase process.
Figure 3B:
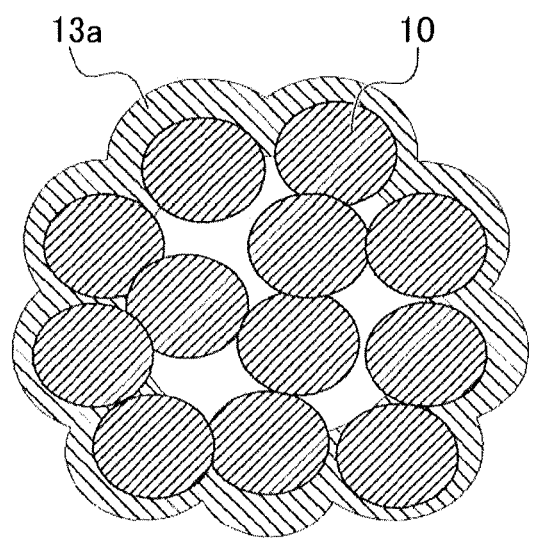
Figure 3C:
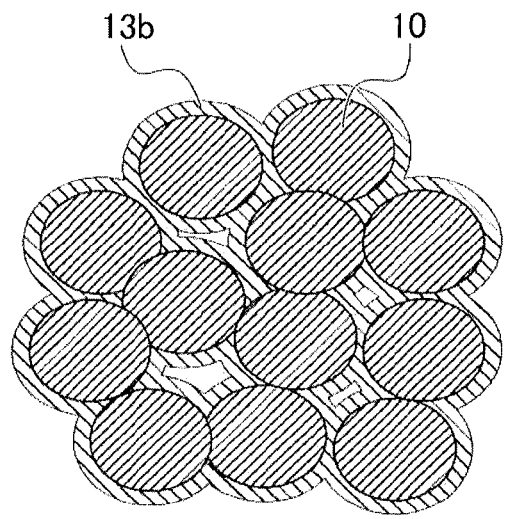

The method is also characterized in that the oxide particle comprises a secondary particle 11 (for example, the mean particle diameter: several to tens of μm) configured such that primary particles 10 (for example, the mean particle diameter: 0.1 to 1 μm) are assembled in an agglomerative form as shown in FIG. 3(a), in which a uniform coating layer 13b at the nano (nm) level can be formed on surfaces of the primary particles 10 through an open pore 12 as shown in FIG. 3(c) in a case where the open pore 12 is present between the primary particles 10.

In contrast, according to the surface treatment by the liquid phase process (a wet process), usually, a coating layer 13a can only be formed mainly on the surface of the secondary particle 11 as shown in FIG. 3(b). Particularly in a case where the primary particles 10 are small (for example, the particle diameter: nano (nm) to submicron order), the surface-treatment layer 13b cannot be substantially formed on the surfaces of the primary particles 10 inside the open pore 12.

Note that in a case where the tumbling fluidized-bed coating process as one of the aforementioned dry coating processes is used, a uniform surface-treatment layer (a coating layer) at the nano (nm) level can be formed unlike the surface treatment by the liquid phase process (the wet method). However, the surface-treatment layer 13b cannot be formed throughout the surfaces of the primary particles 10 inside the open pore 12 as in the case of the surface treatment in the gas phase according to the present invention because a precipitation reaction (the formation of a coating layer) occurs mainly near the secondary particle 11.

As described above, the present invention is characterized in that a uniform surface-treatment layer 13b at the nano level can be formed not only on the surface of the secondary particle 11 of oxide particles, but also on a surface at the open pore 12 between the primary particles 10, more specifically on a surface exposed to the side of the open pore 12 between the primary particles 10, which is a portion of the surfaces of the primary particles 10 inside of the secondary particle 11. This leads to an advantage that the deterioration of an positive-electrode active material due to charge and discharge can be suppressed more effectively because the entire contact surfaces between an electrolyte solution and a positive-electrode active material (the surface of the secondary particle 11 and a surface at the open bore 12) are protected with the surface-treatment layer in an electrolyte solution-based lithium ion battery. In contrast, a surface at the open bore 12 are not protected with a surface-treatment layer by the liquid phase process (the wet process), and a portion of the positive-electrode active material at the location makes contact with an electrolyte solution, promoting the deterioration due to charge and discharge, therefore, the deterioration the positive-electrode active material may not be sufficiently suppressed. The aforementioned feature of the present invention is similarly effective for controlling the elution of a component of a positive-electrode active material into an electrolyte solution. For example, in the case of an electrolyte solution-based lithium ion battery using particles of an positive-electrode active material containing manganese (Mn), which is easily eluted to an electrolyte solution, the surface treatment by the gas phase method according to the present invention can significantly prevent the elution of manganese into an electrolyte solution as compared with the surface treatment by the liquid phase process (the wet process) and the like.

The method of manufacturing surface-treated oxide particles according to the present invention is performed via (a) a surface treatment step of contacting oxide particles having an alkaline compound on some or all of particle surfaces with a gas comprising a volatile acidic compound to form a neutralization product on the surfaces of the oxide particles, and, if desired, (b) a heat treatment step of heating the oxide particles having the neutralization product on the surfaces thereof.

(a) Surface Treatment Step

The surface treatment step is performed as follows: a storage container 15 for oxide particles and a storage container 17 for a volatile acidic compound are placed in a reaction vessel 14, for example, as shown in FIG. 4, and oxide particles 16 and a volatile acidic compound 18 at a predetermined amount are placed in the corresponding storage containers, and left to stand under an atmosphere gas.

The reaction vessel 14 needs to be tightly sealable in order to prevent an atmosphere gas and a vapor of a volatile acidic compound from leaking to outside. Materials for it include plastics such as polyethylene, polypropylene, Teflon®; ceramics such as alumina, quartz, glass; stainless steel (SUS304, SUS316 and the like); metals such as titanium; and the like. However, they are not limited to these as long as they do not react with a vapor of a volatile acidic compound.

The storage container 15 for oxide particles and the storage container 17 for a volatile acidic compound should not react with oxide particles having an alkaline compound and the volatile acidic compound 18, and need to be durable. Materials for them include plastics such as polyethylene, polypropylene, Teflon; ceramics such as alumina, quartz, glass; metals such as stainless steel, titanium; and the like, and they can be appropriately selected depending on the types of oxide particles having an alkaline compound and the volatile acidic compound 18 to be used.

The atmosphere gas should not react with oxide particles having an alkaline compound and the volatile acidic compound 18. Examples of the atmosphere gas include, for example, air, nitrogen, argon and the like. Note that carbon dioxide gas ($CO_2$) and moisture ($H_2O$), which in general easily react with oxide particles having an alkaline compound and the volatile acidic compound 18, are preferred to be sufficiently removed from the atmosphere gas. For example, dry air (dew point temperature: −30° C. or less, preferably −50° C. or less) is preferred, and dry air subjected to decarbonation treatment, high purity nitrogen, high purity argon and the like are more preferred. Depending on the volatile acidic compound 18 and the mixture proportion of a vapor and air and the like, an explosion risk may arise, or oxidation deterioration may occur due to oxygen. In such a case, nitrogen or argon needs to be used instead of air. In any case, the atmosphere gas may appropriately be selected depending on oxide particles having an alkaline compound to be used and the volatile acidic compound 18.

Inside the reaction vessel 14, a vapor of the volatile acidic compound 18 diffuses into an atmosphere gas from the storage container 17 for a volatile acidic compound while the vapor of the volatile acidic compound 18 diffused into the atmosphere gas is consumed by reacting with an alkaline compound on the surfaces of the oxide particles 16 in the inside of the storage container 15 for oxide particles. As a consequence, the mass transfer of the volatile acidic compound 18 from the inside of the storage container 17 for a volatile acidic compound to the inside of the storage container 15 for oxide particles takes place over time.

For example, lithium hydroxide (LiOH) is used as an alkaline compound, and trimethyl borate (trimethoxyborane), trimethyl phosphite (trimethoxyphosphine), tetraethyl orthosilicate (tetraethoxysilane) are used as the volatile acidic compound 18, the reaction formulas (1) to (3) described in the following Chem. 1 to 3, respectively can be conceived as the reactions of a vapor of the volatile acidic compound 18 with oxide particles having an alkaline compound.

[Chem. 1]

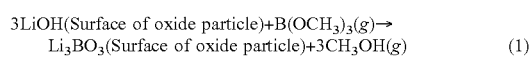
(1)

[Chem. 2]

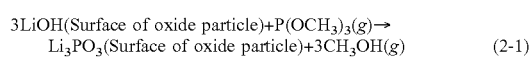
(2-1)

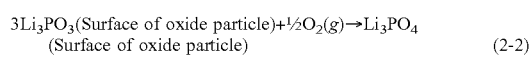
(2-2)

[Chem. 3]

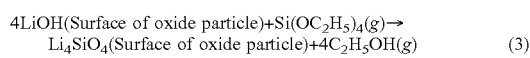
(3)

Note that trimethyl phosphite (trimethoxyphosphine) is readily oxidized if oxygen is contained in the atmosphere gas, and converted into less volatile trimethyl phosphate (trimethoxyphosphine oxide). Therefore, oxygen-free nitrogen or argon needs to be used as the atmosphere gas at the surface treatment step in a case where trimethyl phosphite (trimethoxyphosphine) is used as the volatile acidic compound 18. Subsequently, for example, an atmosphere gas containing oxygen such as air may be introduced to oxidize lithium phosphite ($Li_3PO_3$) as a neutralization product after the completion of the surface treatment reaction (the reaction formula (2-1)) in the Chem. 2. Then lithium phosphate ($Li_3PO_4$) can be obtained (the reaction formula (2-2)).

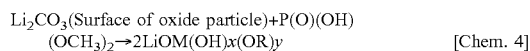
[Chem. 4]

Note that, for example, in a case where an alkaline compound comprises lithium carbonate ($Li_2CO_3$) mixed with lithium hydroxide (LiOH), a compound having a hydroxy group (—OH) is preferably used as the volatile acidic compound 18 for the reaction of the vapor of the volatile acidic compound 18 with the oxide particles having the alkaline compound. For example, in a case where dimethyl phosphate (dimethyl phosphate) is used, the reaction formula (4) shown in the above Chem. 4 can be conceived.

[Chem. 5]

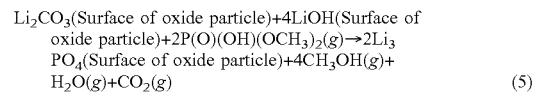
(5)

In the reaction formula (5), a carbon dioxide absorbing agent which absorbs only carbon dioxide ($CO_2$) produced in the reaction can also be placed in the reaction system to promote the above reaction formula (5).

Here, for example, the amount of surface treatment (or a thickness of the surface-treatment layer) on oxide particles having an alkaline compound by the volatile acidic compound 18 can be controlled as follows. First, a predetermined amount of the oxide particles 16 having an alkaline compound are placed in the storage container 15 for oxide particles, and the volatile acidic compound 18 in an amount required for surface treatment of the above oxide particles having an alkaline compound is placed in the storage container 17 for a volatile acidic compound. Then, the reaction vessel 14 is filled with an atmosphere gas, and left to stand as it is. Once the volatile acidic compound 18 in the storage container 17 for a volatile acidic compound disappears completely, the reaction is terminated.

In this method, essentially all of the volatile acidic compound 18 introduced into the reaction vessel 14 is consumed for the surface treatment of the oxide particles having an alkaline compound. Therefore, the mixture proportion of the oxide particles having an alkaline compound used and the volatile acidic compound 18 used (the oxide particles having an alkaline compound:the volatile acidic compound 18 [mass ratio]) will directly be the mixture proportion of the oxide particles having an alkaline compound and the volatile acidic compound 18 after the surface treatment.

A method of controlling the amount of surface treatment (or the thickness of a surface-treatment layer) different from the above method is described as follows. The volatile acidic compound 18 in an excess amount as compared with the desired amount for surface treatment of oxide particles having an alkaline compound is placed in the storage container 17 for a volatile acidic compound, and then the reaction vessel 14 is filled with an atmosphere gas, and left to stand as it is. After a certain time has passed, the storage container 17 for a volatile acidic compound may be removed from the reaction vessel 14 to terminate the reaction while a portion of the volatile acidic compound still remains. The volatilized amount of the volatile acidic compound 18 can be calculated from the remaining amount in the storage container 17 for a volatile acidic compound.

Again, in this method, essentially all of the volatile acidic compound 18 evaporated from the inside of the reaction vessel 14 is consumed for the surface treatment of the oxide particles having an alkaline compound. Therefore, the mixture proportion of the oxide particles having an alkaline compound used and the volatile acidic compound 18 used (the oxide particles having an alkaline compound: the volatile acidic compound 18 [mass ratio]) will directly be the mixture proportion of the oxide particles having an alkaline compound and the volatile acidic compound 18 after the surface treatment.

In the case of the surface treatment by the gas phase process according to the present invention, a surface-treatment layer (a coating layer) is also formed on the surfaces of the primary particles 10 within the open pore 12 as described above. Therefore, the mixture proportion of the oxide particles having an alkaline compound and the volatile acidic compound 18 for obtaining a predetermined surface-treatment layer (a coating layer) is preferably calculated based on the specific surface area (BET value [unit: $m^2/g$]) of the oxide particles to be used.

Note that when performing the surface treatment step, an atmosphere gas containing a vapor of the volatile acidic compound 18 in the reaction vessel 14 may be circulated by forced convection by means of a fan 19 and the like as shown in FIG. 5. The convection of the atmosphere gas can allow a vapor of the volatile acidic compound 18 to undergo mass transfer from the inside of the storage container 17 for a volatile acidic compound to the oxide particles having an alkaline compound (the oxide particles 16) in a shorter period of time, thereby significantly reducing the time required for surface treatment.

Figure 6:
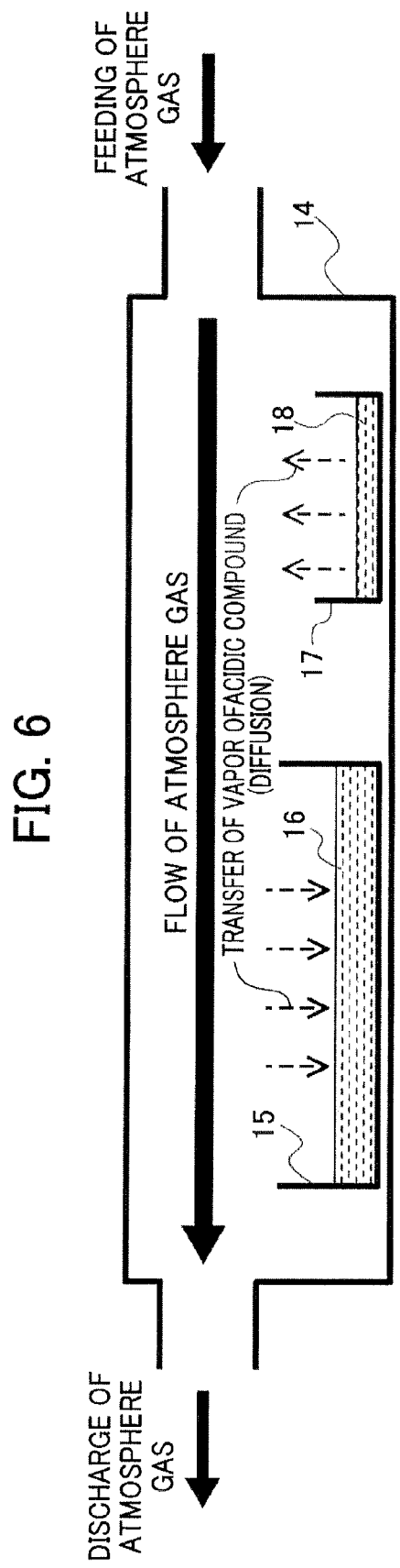
FIG. 6 is a schematic diagram illustrating an example of the method of manufacturing surface-treated oxide particles by the gas phase process using a volatile acidic compound according to the present invention, the method being performed while feeding an atmosphere gas into a reaction vessel.

Further, as shown in FIG. 6, the surface treatment of oxide particles having an alkaline compound (the oxide particles 16) in the inside of the storage container 15 for oxide particles can also be performed by feeding an atmosphere gas containing a vapor of the volatile acidic compound 18 into the reaction vessel 14 at a predetermined flow rate.

Figure 7:
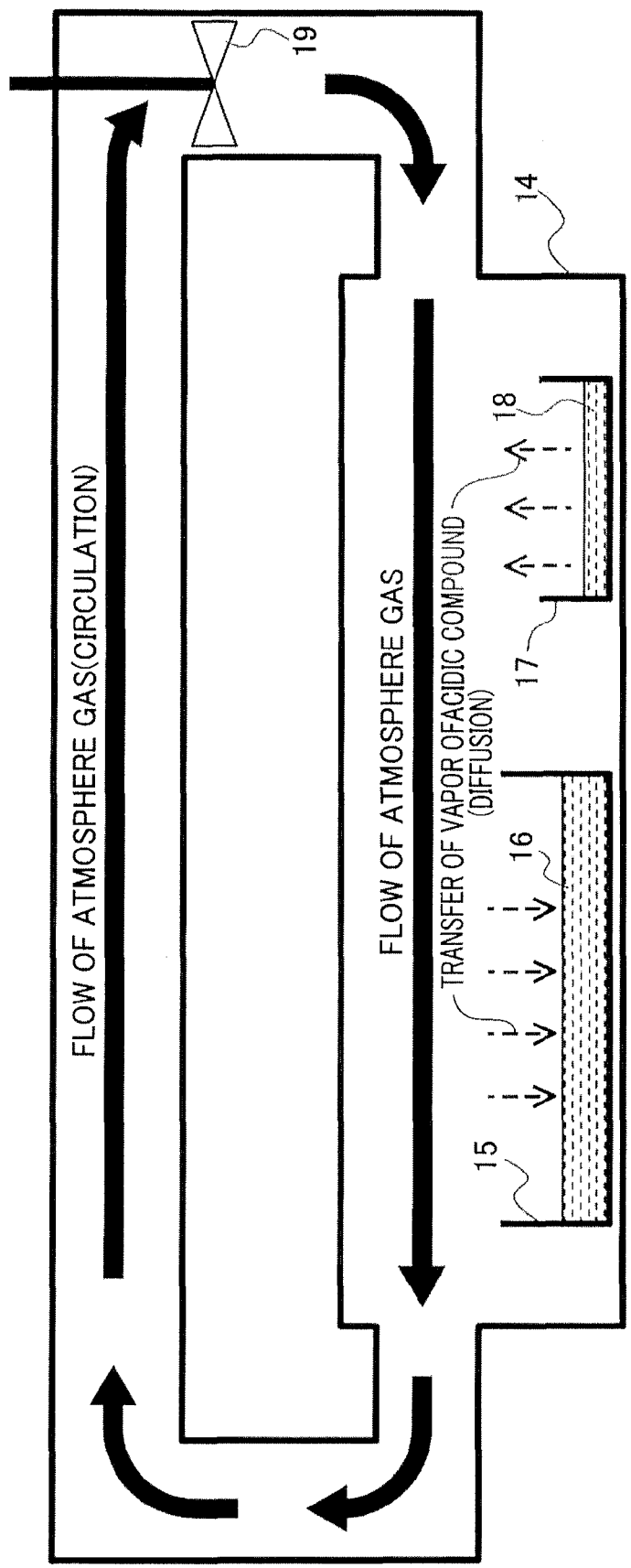
FIG. 7 is a schematic diagram illustrating an example of the method of manufacturing surface-treated oxide particles by the gas phase process using a volatile acidic compound according to the present invention, the method being performed while circulating an atmosphere gas within a reaction vessel.
Figure 8:
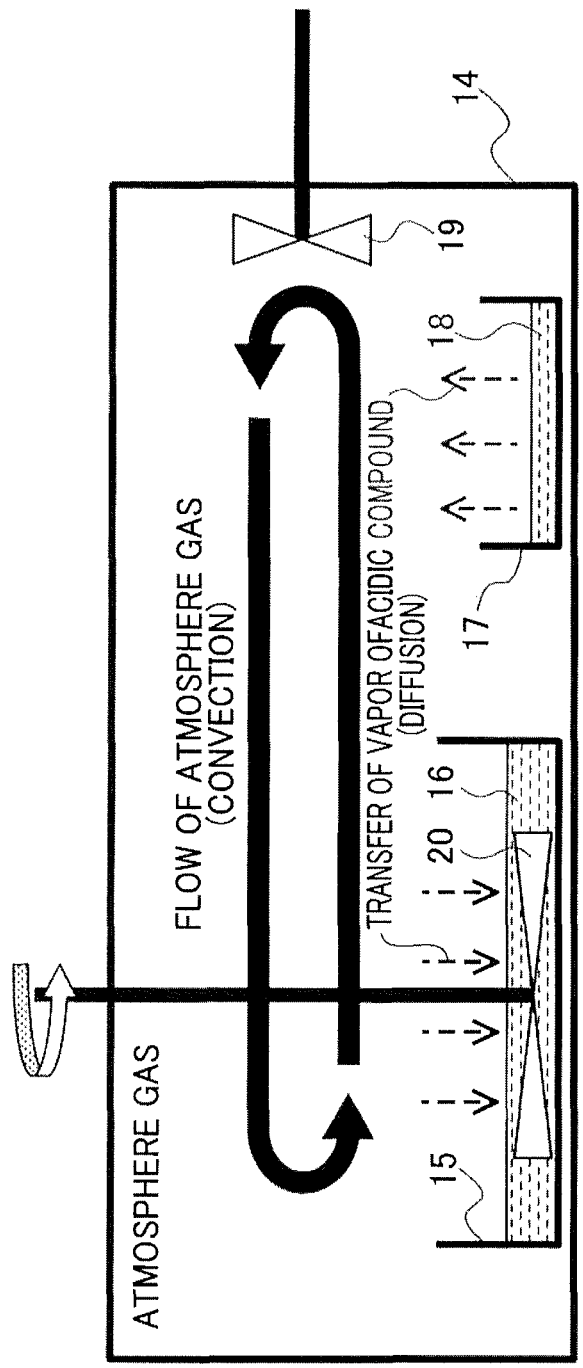
FIG. 8 is a schematic diagram illustrating an example of the method of manufacturing surface-treated oxide particles by the gas phase process using a volatile acidic compound according to the present invention, the method being performed while stirring/fluidizing the oxide particles.
Figure 9:
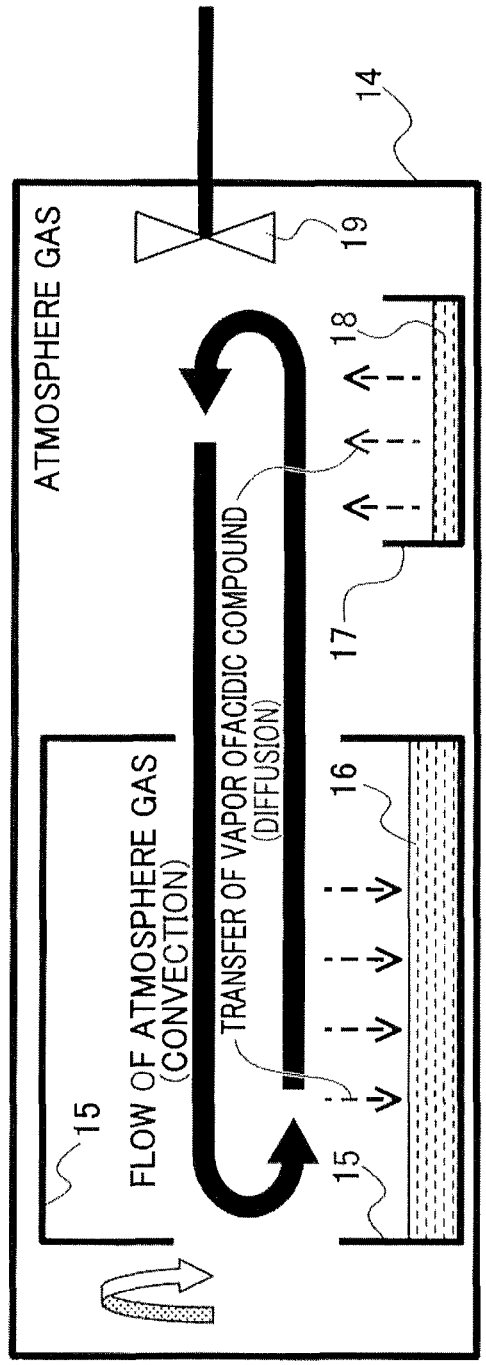
FIG. 9 is a schematic diagram illustrating another example of the method of manufacturing surface-treated oxide particles by the gas phase process using a volatile acidic compound according to the present invention, the method being performed while stirring/fluidizing the oxide particles.

Moreover, as shown in FIG. 7, the surface treatment of the oxide particles 16 having an alkaline compound in the inside of the storage container 15 for oxide particles can also be performed by circulating an atmosphere gas containing a vapor of the volatile acidic compound 18 fed into the reaction vessel 14 in FIG. 6 by means of the fan 19 and the like.

Furthermore, oxide particles having an alkaline compound (the oxide particles 16) in the inside of the storage container 15 for oxide particles is preferably stirred/fluidized as shown in FIGS. 8 to 11. This is because of the following reasons: the effective area of the surfaces of oxide particles which can make contact with and react with a vapor of the volatile acidic compound 18 can be significantly increased by the fluidization of the oxide particles having an alkaline compound; at the same time, the reaction rate can be significantly increased due to the equalized contact probability; at the same time, a neutralization product obtained from the reaction can be uniformly formed on oxide particles. That is, the aforementioned fluidization of the oxide particles has the following effects: the rate of surface treatment of oxide particles with the volatile acidic compound 18 can be increased; and at the same time, the variations in surface treatment within an oxide particle and between oxide particles can be prevented.

Figure 10:
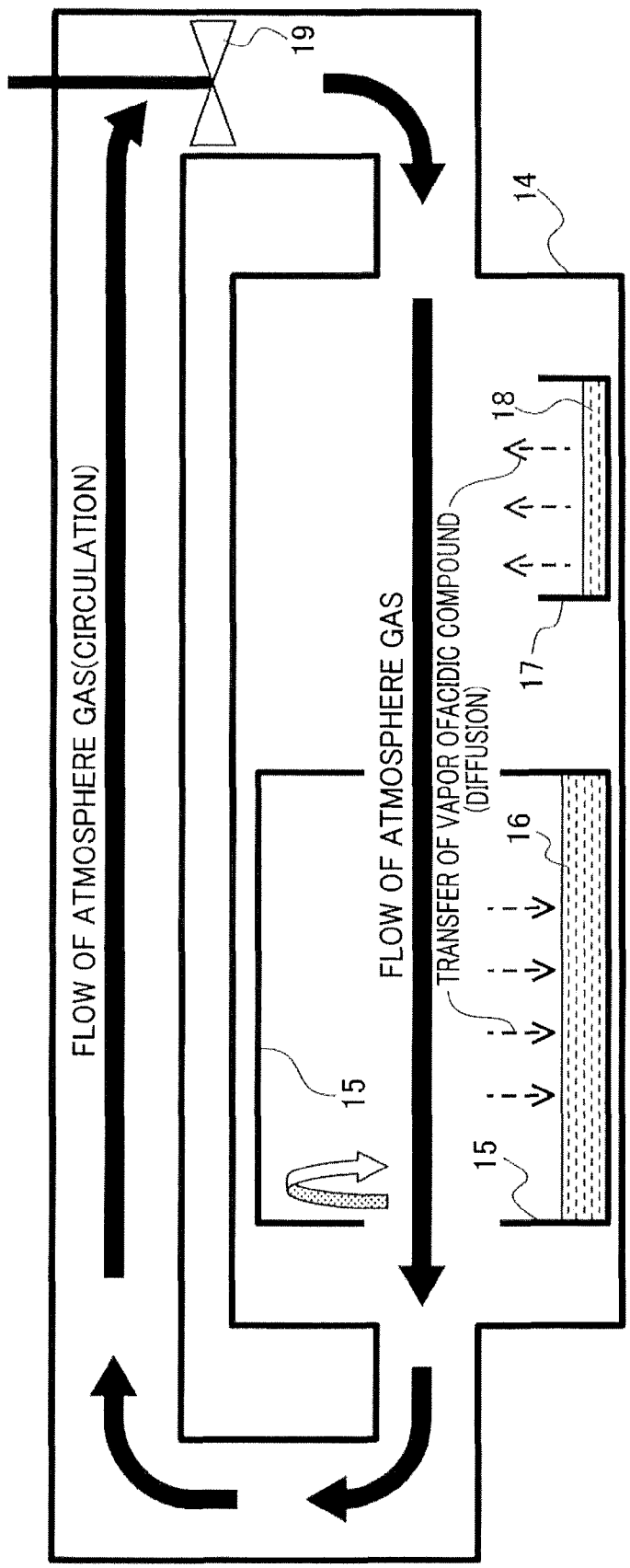
FIG. 10 is a schematic diagram illustrating an example of the method of manufacturing surface-treated oxide particles by the gas phase process using a volatile acidic compound according to the present invention, the method being performed while stirring/fluidizing the oxide particles, and circulating an atmosphere gas within a reaction vessel.
Figure 11:
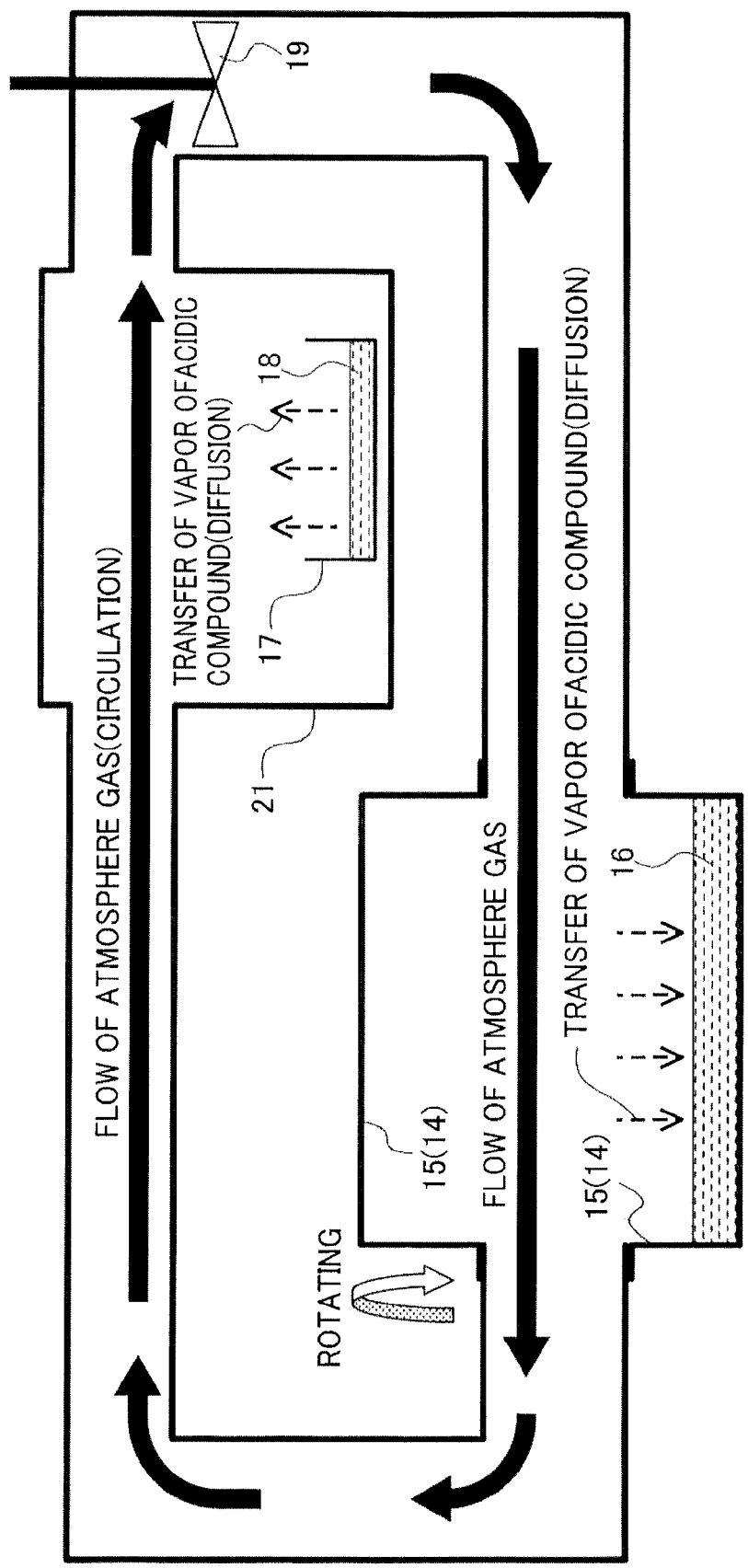
FIG. 11 is a schematic diagram illustrating another example of the method of manufacturing surface-treated oxide particles by the gas phase process using a volatile acidic compound according to the present invention, the method being performed while stirring/fluidizing the oxide particles and circulating an atmosphere gas within a reaction vessel.

Note that FIG. 11 shows the method of performing surface treatment comprising circulating an atmosphere gas according to FIG. 10, wherein a volatilization container 21 for volatilizing the volatile acidic compound 18 is placed in a circulating route of the atmosphere gas independently of the reaction vessel 14 for performing surface treatment. Further, the storage container 15 for oxide particles also serves as the reaction vessel 14, and the reaction vessel 14 is slowly rotated to allow stirring/fluidizing of oxide particles having an alkaline compound (the oxide particles 16). According to this approach, advantageously, the volatilized amount of the volatile acidic compound 18 (i.e., the amount of surface treatment) can easily be detected, for example, by using a transparent member such as glass for the storage container 17 for a volatile acidic compound and the volatilization container 21, or arranging a transparent window for visual detection.

Further, the temperatures of the volatilization container 21, the volatile acidic compound 18, the reaction vessel 14, oxide particles having an alkaline compound (the oxide particles 16) can be increased by providing a heating heater and the like in any position within the circulation route of the atmosphere gas to heat/increase the temperature of the atmosphere gas. Therefore, surface treatment under heating conditions can easily be performed. Advantageously, a wider range of the volatile acidic compounds 18 can be utilized in the surface treatment under heating conditions because the volatile acidic compounds 18 which are less volatile can also be used for the surface treatment (for example, those compounds containing an element such as titanium, tungsten, zirconium, aluminum in addition to boron, phosphorus and silicon as main elements of boric acid compounds, phosphoric acid compounds, phosphorous acid compounds and silicic acid compounds can be used as volatile acidic compounds.).

(b) Heat Treatment Step

The following heat treatment step may be performed, if desired, at 100 to 500° C., preferably at 150 to 300° C. By performing the heat treatment step, the crystallinity of a neutralization product formed on the surfaces of oxide particles may be enhanced, or impurities such as organic components and a trace amount of moisture may be removed from the neutralization product.

The surface-treated oxide particles obtained by the aforementioned method may be prepared as a known paste for forming an active-material layer (a positive electrode, a negative electrode), or a coating liquid for forming a solid-electrolyte layer. Application of a paste or a coating liquid is preferably performed under a clean atmosphere such as in a clean room where temperature and humidity are controlled. Usually, the temperature therein is a room temperature (about 25° C.), and the humidity therein is 40 to 60% RH.

As described above, the method of manufacturing surface-treated oxide particles according to the present invention can allow a dense and uniform nano-order surface-treatment layer to be formed on the surfaces of oxide particles (the surfaces of secondary particles, and the surfaces at open pore between primary particles) in a simple way by the gas phase process. Therefore, high-performance oxide particles can be manufactured at low cost. Further, the oxide particles obtained by this method are effective in inhibiting gelation of a paste for forming an active-material layer of an electrolyte solution-based secondary battery (an active-material paste), and reducing the interface resistance of active-material particles/a sulfide-based solid electrolyte in a sulfide-based all-solid secondary battery. Therefore, they can significantly contribute to provision of a low-cost secondary battery with improved properties when used for an active-material layer (a positive electrode, a negative electrode) of an electrolyte solution-based secondary battery or an all-solid secondary battery.

EXAMPLES

Below, the present invention will be described in detail with reference to Examples, but the present invention shall not be limited to these Examples.

[Preliminary Tests]

Before performing the surface treatment of oxide particles having an alkaline compound using a volatile acidic compound by the gas phase process according to the present invention, the reactivity of particles of the alkaline compound alone with the volatile acidic compound was first investigated.

(1) Preliminary Test 1

In FIG. 5, instead of the oxide particles 16, 1.224 g of particles of lithium hydroxide (LiOH.H$_2$O) as particles of an alkaline compound alone was placed in the inside of a storage container 15 for oxide particles (a glass petri dish). As a volatile acidic compound 18, 1.01 g of trimethyl borate (trimethoxyborane) [B(OCH$_3$)$_3$] (boiling point: 68° C., melting point: −34° C.) was placed in the inside of a storage container 17 for a volatile acidic compound (a glass petri dish). These were placed in the inside of a reaction vessel 14 (a glass desiccator), which was then filled with dry air (dew point temperature: −60° C.) as an atmosphere gas. Then, the atmosphere gas was circulated within the reaction vessel 14 by means of a fan 19, and left to stand at the room temperature (25° C.) for 12 hours. Thereby, the particles of lithium hydroxide (LiOH.H$_2$O) were allowed to react with a vapor of trimethyl borate (trimethoxyborane) in the gas phase to obtain particles of a neutralization product. Note that trimethyl borate (trimethoxyborane) in the inside of the storage container 17 for a volatile acidic compound (a glass petri dish) disappeared completely after being left to stand for 12 hours as described above. Presumably all of it reacted with the particles of lithium hydroxide (LiOH.H$_2$O), and was consumed for the synthesis of the particles of the neutralization product.

The above particles of the neutralization product were further heat-treated for 30 minutes at 500° C. under dry air (dew point temperature: −60° C.) to obtain particles of a white lithium boron composite oxide. The main component of these was identified as trilithium borate (Li$_3$BO$_3$) as analyzed by X ray diffraction measurements.

The above results demonstrated that particles of a neutralization product can be synthesized by allowing trimethyl borate (trimethoxyborane) as the volatile acidic compound 18 to react with particles of lithium hydroxide (LiOH.H$_2$O) as particles of an alkaline compound alone by the gas phase process.

(2) Preliminary Test 2

In FIG. 5, instead of the oxide particles 16, 0.707 g of particles of lithium hydroxide (LiOH.H$_2$O) as particles of an alkaline compound alone was placed in the inside of the storage container 15 for oxide particles (a glass petri dish). As the volatile acidic compound 18, 0.566 g of trimethyl phosphite (trimethoxyphosphine) [P(OCH$_3$)$_3$] (boiling point: 111° C., melting point: −75° C.) was placed in the inside of the storage container 17 for a volatile acidic compound (a glass petri dish). These were placed in the inside of the reaction vessel 14 (a glass desiccator). While preventing oxidation of trimethyl phosphite (trimethoxyphosphine) by filling the vessel with high purity nitrogen gas (dew point temperature: −80° C.) as an atmosphere gas, the atmosphere gas was circulated within the reaction vessel 14 by means of the fan 19, and left to stand for 12 hours at the room temperature (25° C.). Thereby, the particles of lithium hydroxide (LiOH.H$_2$O) were allowed to react with a vapor of trimethyl phosphite (trimethoxyphosphine) in the gas phase to obtain particles of a neutralization product. Note that trimethyl phosphite (trimethoxyphosphine) in the inside of the storage container 17 for a volatile acidic compound (a glass petri dish) disappeared completely after being left to stand for 12 hours as described above. Presumably all of it reacted with the particles of lithium hydroxide (LiOH.H$_2$O), and was consumed for the synthesis of the particles of the neutralization product.

The above particles of the neutralization product were further heat-treated for 30 minutes at 500° C. under dry air (dew point temperature: −60° C.) (phosphite was oxidized and converted into phosphate) to obtain particles of a white lithium boron composite oxide. The main component of these was identified as Li$_3$PO$_4$ as analyzed by X ray diffraction measurements.

The above results demonstrated that particles of a neutralization product can be synthesized by allowing trimethyl phosphite (trimethoxyphosphine) as the volatile acidic compound 18 to react with particles of lithium hydroxide (LiOH.H$_2$O) as particles of an alkaline compound alone by the gas phase process.

(3) Preliminary Test 3

In FIG. 5, instead of the oxide particles 16, 1.513 g of particles of lithium hydroxide (LiOH.H$_2$O) as particles of an alkaline compound alone was placed in the inside of the storage container 15 for oxide particles (a glass petri dish). As the volatile acidic compound 18, 1.05 g of tetraethyl orthosilicate (tetraethoxysilane) [Si(OC$_2$H$_5$)$_4$] was placed in the inside of the storage container 17 for a volatile acidic compound (a glass petri dish). These were placed in the inside of the reaction vessel 14 (a glass desiccator), which was then filled with dry air (dew point temperature: −60° C.) as an atmosphere gas. Then, the atmosphere gas was circulated within the reaction vessel 14 by means of the fan 19, and left to stand at the room temperature (25° C.) for 12 hours. Thereby, the particles of lithium hydroxide (LiOH.H$_2$O) were allowed to react with a vapor of tetraethyl orthosilicate (tetraethoxysilane) in the gas phase to obtain particles of a neutralization product. Note that tetraethyl orthosilicate (tetraethoxysilane) in the storage container 17 for a volatile acidic compound (a glass petri dish) disappeared completely after being left to stand for 12 as described above. Presumably all of it reacted with the particles of lithium hydroxide (LiOH.H$_2$O), and was consumed for the synthesis of the particles of the neutralization product.

The above particles of the neutralization product were further heat-treated for 30 minutes at 500° C. under dry air (dew point temperature: −60° C.) to obtain particles of a white lithium silicon composite oxide. The main component of these was identified as Li$_4$SiO$_4$ as analyzed by X ray diffraction measurements.

The above results demonstrated that particles of a neutralization product can be synthesized by allowing tetraethyl orthosilicate (tetraethoxysilane) as the volatile acidic compound 18 to react with particles of lithium hydroxide (LiOH.H$_2$O) as particles of an alkaline compound alone by the gas phase process.

Example 1

[Oxide Particles]

Oxide particles comprising a lithium-nickel-cobalt-aluminum oxide (Li$_{1+x}$Ni$_{0.82}$Co$_{0.15}$Al$_{0.03}$O$_2$; x=0.05) used for a positive-electrode active material of a lithium ion battery was used as the oxide particles. The above composition contains a lithium oxide (LiO$_{0.5}$) in a 0.05-times (mole ratio) excess amount relative to the stoichiometric composition (LiNi$_{0.82}$Co$_{0.15}$Al$_{0.03}$O$_2$), and hereinafter, the above oxide particles are referred to as lithium oxide-rich NCA particles. The lithium oxide contained in an excess amount appears to be solid-dissolved in the NCA particles. Therefore, the excess lithium oxide (an alkaline compound) is assumed to be uniformly distributed over the surfaces of the above lithium oxide-rich NCA particles. Note that the above oxide particles are secondary particles with a particle diameter of 5 to 15 μm comprising primary particles with a particle diameter of 0.3 to 1 μm, in which open pore with a size of 10 nm to several hundreds of nm are present between the primary particles.

[Surface Treatment of Oxide Particles]

As shown in FIG. 5, 134.9 g of the above lithium oxide-rich NCA particles for the oxide particles 16 were placed in the inside of the storage container 15 for oxide particles (a glass petri dish). As the volatile acidic compound 18, 2.28 g of trimethyl borate (trimethoxyborane) [B(OCH$_3$)$_3$] (boiling point: 68° C., melting point: −34° C.) was placed in the inside of the storage container 17 for a volatile acidic compound (a glass petri dish). These were placed in the inside of the reaction vessel 14 (a glass desiccator), which was then filled with dry air (dew point temperature: −60° C.) as an atmosphere gas. Then, the atmosphere gas was circulated within the reaction vessel 14 by means of the fan 19, and left to stand at the room temperature (25° C.) for 12 hours. Thereby, the lithium oxide (or lithium hydroxide) (an alkaline compound) present on the surfaces of the lithium oxide-rich NCA particles was allowed to react with a vapor of trimethyl borate (trimethoxyborane) in the gas phase to form a neutralization product on the surfaces of the lithium oxide-rich NCA particles. Subsequently, in accordance with the method of manufacturing surface-treated oxide particles according to Example 1, heat-treatment was further performed for 30 minutes at 150° C. under dry air (dew point temperature: −60° C.) to obtain the surface-treated oxide particles according to Example 1 having surfaces coated with the above neutralization product (NCA particles for a positive-electrode active material of a lithium ion battery).

Note that trimethyl borate (trimethoxyborane) in the inside of the storage container 17 for a volatile acidic compound (a glass petri dish) disappeared completely after being left to stand for 12 hours as described above. Presumably, all of it was consumed for forming the neutralization product on the surfaces of the lithium oxide-rich NCA particles.

As performing image observation of the above surface-treated oxide particles having surfaces coated with the above neutralization product (NCA particles for a positive-electrode active material of a lithium ion battery) with a scanning microscope (SEM), the formation of a uniform coating layer was observed on the particle surfaces (the surfaces of the secondary particles and the surfaces at the open pore). The thickness of the coating layer was estimated to be about 17 nm.

[Characterization]

Next, a paste for forming a positive-electrode active-material layer was produced using the surface-treated oxide particles coated with the neutralization product obtained (NCA particles for a positive-electrode active material of a lithium ion battery). The paste was observed not to undergo gelation (pudding formation), but maintain fluidity even after being left to stand for 4 days at room temperature.

Note that the above paste for forming a positive-electrode active-material layer was produced as follows: the surface-treated oxide particles as a positive-electrode active material, acetylene black (AB) as an electroconductive auxiliary agent, poly(vinylidene fluoride) (PVDF) as a binding material (binder), N-methylpyrrolidone (NMP) as an organic solvent were mixed and treated for dispersion in the ratio of oxide particles:AB:PVDF:NMP=45:2.5:2.5:50 (mass ratio) (a state where the oxide particles and AB were dispersed in NMP in which PVDF is dissolved).

In addition, the positive-electrode capacity was 196 mAh/g (rate: 0.05 C) as measured in a coin cell (a positive-electrode active material/an electrolyte solution (a separator)/a negative-electrode active material (a Li foil)) where the positive-electrode active-material layer obtained by applying, drying and pressing the above paste for forming a positive-electrode active-material layer was used.

Example 2

The surface-treated oxide particles having surfaces coated with the above neutralization product according to Example 2 (NCA particles for a positive-electrode active material of a lithium ion battery) were obtained in accordance with the method of manufacturing surface-treated oxide particles according to Example 2 performed as in Example 1 except that the heating treatment was performed for 30 minutes at 300° C. instead of 30 minutes at 150° C. in Example 1.

[Characterization]

Next, a paste for forming a positive-electrode active-material layer was produced as in Example 1 using the surface-treated oxide particles coated with the neutralization product obtained (NCA particles for a positive-electrode active material of a lithium ion battery). The paste was observed not to undergo gelation (pudding formation), but maintain fluidity even after being left to stand for 7 days at room temperature.

In addition, the positive-electrode capacity was 194 mAh/g as measured in a coin cell (a positive-electrode active material/an electrolyte solution (a separator)/a negative-electrode active material (a Li foil)) where the positive-electrode active-material layer obtained by applying, drying and pressing the above paste for forming a positive-electrode active-material layer was used.

Example 3

[Surface Treatment of Oxide Particles]

As shown in FIG. 5, 49.3 g of the lithium oxide-rich NCA particles according to Example 1 as the oxide particles 16 were placed in the inside of the storage container 15 for oxide particles (a glass petri dish). As the volatile acidic compound 18, 0.96 g of trimethyl phosphite (trimethoxyphosphine) [P(OCH$_3$)$_3$] (boiling point: 111° C., melting point: −75° C.) was placed in the inside of the storage container 17 for a volatile acidic compound (a glass petri dish). These were placed in the inside of the reaction vessel 14 (a glass desiccator), which was then filled with nitrogen (dew point temperature: −60° C. or less) as an atmosphere gas. Then, the atmosphere gas was circulated within the reaction vessel 14 by means of the fan 19, and left to stand at the room temperature (25° C.) for 24 hours. Thereby, the lithium oxide (or lithium hydroxide, an alkaline compound) present on the surfaces of the lithium oxide-rich NCA particles was allowed to react with a vapor of trimethyl phosphite (trimethoxyphosphine) in the gas phase to form a neutralization product on the surfaces of the lithium oxide-rich NCA particles. Subsequently, in accordance with the method of manufacturing surface-treated oxide particles according to Example 3, the atmosphere of nitrogen was replaced with dry air (dew point temperature: −60° C.), and then heat-treatment was performed for 30 minutes at 150° C. to obtain the surface-treated oxide particles according to Example 3 having surfaces coated with the above neutralization product (NCA particles for a positive-electrode active material of a lithium ion battery).

Note that trimethyl phosphite (trimethoxyphosphine) in the inside of the storage container 17 for a volatile acidic compound (a glass petri dish) disappeared completely after being left to stand for 24 hours as described above. Presumably, all of it was consumed for forming the neutralization product on the surfaces of the lithium oxide-rich NCA particles.

Figure 12:
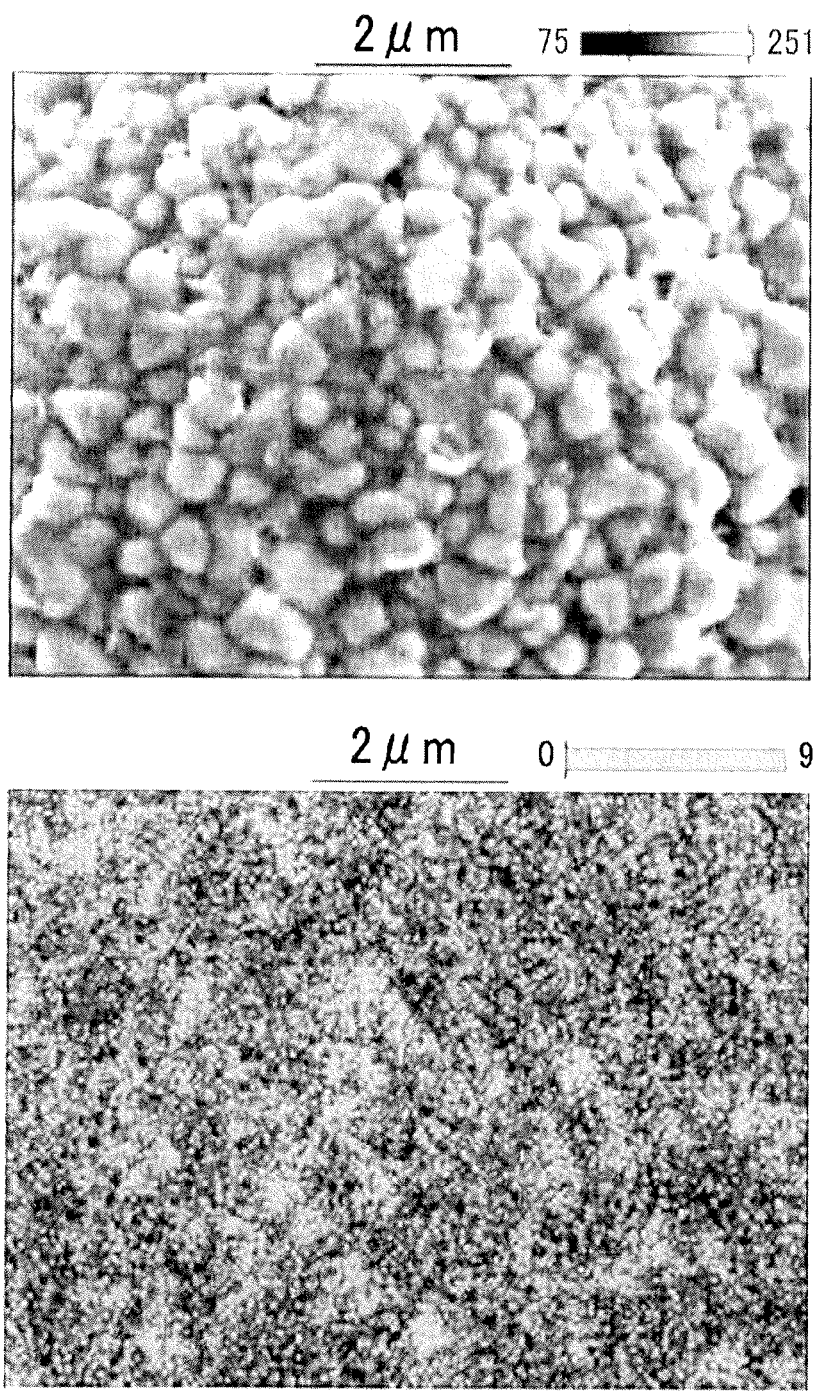
FIG. 12 shows a scanning electron microscope image (SEM image) of surface-treated oxide particles (secondary particles) according to Example 3 of the present invention configured such that primary particles are assembled in an agglomerative form and each having a surface-treated layer formed by the gas phase process (top panel), and the distribution of phosphorus (P) in the surface-treated layers by energy dispersive X-ray analysis (EDS analysis) in the same field (bottom panel).

As performing image observation and energy dispersive X-ray analysis (EDS analysis) of the above surface-treated oxide particles having surfaces coated with the above neutralization product (NCA particles for a positive-electrode active material of a lithium ion battery) with a scanning microscope (SEM), the formation of a uniform coating layer was observed on the particle surfaces (the surfaces of the secondary particles and the surfaces at the open pore). The average thickness of the coating layer was estimated to be about 23 nm. (with reference to FIG. 12, the bottom panel showing the results of the EDS analysis demonstrated that phosphorus (P) was uniformly distributed over the surface-treatment layer. In the figure, those portions which are darker in tone correspond to the distribution of phosphorus.)
[Characterization]

Next, a paste for forming a positive-electrode active-material layer was produced as in Example 1 using the surface-treated oxide particles coated with the neutralization product obtained (NCA particles for a positive-electrode active material of a lithium ion battery). The paste was observed not to undergo gelation (pudding formation), but maintain fluidity even after being left to stand for 4 days at room temperature.

In addition, the positive-electrode capacity was 195 mAh/g as measured in a coin cell (a positive-electrode active material/an electrolyte solution (a separator)/a negative-electrode active material (a Li foil)) where the positive-electrode active-material layer obtained by applying, drying and pressing the above paste for forming a positive-electrode active-material layer was used.

Example 4

The surface-treated oxide particles having surfaces coated with the above neutralization product according to Example 4 (NCA particles for a positive-electrode active material of a lithium ion battery) were obtained in accordance with the method of manufacturing surface-treated oxide particles according to Example 4 performed as in Example 3 except that the heating treatment was performed for 30 minutes at 300° C. instead of 30 minutes at 150° C. in Example 3.
[Characterization]

Next, a paste for forming a positive-electrode active-material layer was produced as in Example 1 using the surface-treated oxide particles coated with the neutralization product obtained (NCA particles for a positive-electrode active material of a lithium ion battery). The paste was observed not to undergo gelation (pudding formation), but maintain fluidity even after being left to stand for 7 days at room temperature.

In addition, the positive-electrode capacity was 196 mAh/g as measured in a coin cell (a positive-electrode active material/an electrolyte solution (a separator)/a negative-electrode active material (a Li foil)) where the positive-electrode active-material layer obtained by applying, drying and pressing the above paste for forming a positive-electrode active-material layer was used.

Example 5

[Surface Treatment of Oxide Particles]
As shown in FIG. 4, 119.6 g of the lithium oxide-rich NCA particles according to Example 1 as the oxide particles 16 were placed in the inside of the storage container 15 for oxide particles (a glass petri dish). As the volatile acidic compound 18, 2.56 g of tetraethyl orthosilicate (tetraethoxysilane) [Si(OC$_2$H$_5$)$_4$] (boiling point: 165° C., melting point: −82° C.) was placed in the inside of the storage container 17 for a volatile acidic compound (a glass petri dish). These were placed in the inside of the reaction vessel 14 (a glass desiccator), which was then filled with dry air (dew point temperature: −60° C.) as an atmosphere gas. Then, the atmosphere gas was circulated within the reaction vessel 14 by means of the fan 19, and left to stand at the room temperature (25° C.) for 48 hours. Thereby, the lithium oxide (or lithium hydroxide) (an alkaline compound) present on the surfaces of the lithium oxide-rich NCA particles was allowed to react with a vapor of tetraethyl orthosilicate (tetraethoxysilane) in the gas phase to form a neutralization product on the surfaces of the lithium oxide-rich NCA particles. Subsequently, in accordance with the method of manufacturing surface-treated oxide particles according to Example 5, heat-treatment was performed under dry air (dew point temperature: −60° C.) for 30 minutes at 150° C. to obtain the surface-treated oxide particles according to Example 5 having surfaces coated with the above neutralization product (NCA particles for a positive-electrode active material of a lithium ion battery).

Note that tetraethyl orthosilicate (tetraethoxysilane) in the inside of the storage container 17 for a volatile acidic compound (a glass petri dish) disappeared completely after being left to stand for 48 hours as described above. Presumably, all of it was consumed for forming the neutralization product on the surfaces of the lithium oxide-rich NCA particles.

As performing image observation with a scanning microscope (SEM) and energy dispersive X-ray analysis (EDS analysis) of the above surface-treated oxide particles having surfaces coated with the above neutralization product (NCA particles for a positive-electrode active material of a lithium ion battery), the formation of a uniform coating layer was observed on the particle surfaces (the surfaces of the secondary particles and the surfaces at the open pore). The average thickness of the coating layer was estimated to be about 15 nm. (With reference to FIG. 13, the bottom panel showing the results of the EDS analysis demonstrated that silicon (Si) is uniformly distributed over the surface-treatment layer. In the figure, portions which are darker in tone correspond to the distribution of silicon.)
[Characterization]

Next, a paste for forming a positive-electrode active-material layer was produced as in Example 1 using the surface-treated oxide particles coated with the neutralization product obtained (NCA particles for a positive-electrode active material of a lithium ion battery). The paste was observed not to undergo gelation (pudding formation), but maintain fluidity even after being left to stand for 4 days at room temperature.

In addition, the positive-electrode capacity was 194 mAh/g as measured in a coin cell (a positive-electrode active material/an electrolyte solution (a separator)/a negative-electrode active material (a Li foil)) where the positive-electrode active-material layer obtained by applying, drying and pressing the above paste for forming a positive-electrode active-material layer was used.

Example 6

The surface-treated oxide particles having surfaces coated with the above neutralization product according to Example 6 (NCA particles for a positive-electrode active material of a lithium ion battery) were obtained in accordance with the method of manufacturing surface-treated oxide particles according to Example 6 performed as in Example 5 except that the heating treatment was performed for 30 minutes at 300° C. instead of 30 minutes at 150° C. in Example 5.

[Characterization]

Next, a paste for forming a positive-electrode active-material layer was produced as in Example 1 using the surface-treated oxide particles coated with the neutralization product obtained (NCA particles for a positive-electrode active material of a lithium ion battery). The paste was observed not to undergo gelation (pudding formation), but maintain fluidity even after being left to stand for 7 days at room temperature.

In addition, the positive-electrode capacity was 195 mAh/g as measured in a coin cell (a positive-electrode active material/an electrolyte solution (a separator)/a negative-electrode active material (a Li foil)) where the positive-electrode active-material layer obtained by applying, drying and pressing the above paste for forming a positive-electrode active-material layer was used.

Example 7

[Oxide Particles]

Oxide particles comprising a lithium-nickel-cobalt-aluminum oxide ($Li_{1+x}Ni_{0.82}Co_{0.15}Al_{0.03}O_2$; x=0.03) used for a positive-electrode active material of a lithium ion battery was used as the oxide particles. The above composition contains a lithium oxide ($LiO_{0.5}$) in a 0.03-times excess amount relative to the stoichiometric composition ($LiNi_{0.82}Co_{0.15}Al_{0.03}O_2$).

[Surface Treatment of Oxide Particles]

As shown in FIG. 5, 207.15 g of $Li_{1.03}Ni_{0.82}Co_{0.15}Al_{0.03}O_2$ (mean particle diameter: 11.7 μm, BET specific surface area: 0.3 m$^2$/g) as the oxide particles 16 was placed in the inside of a storage container (a glass petri dish). As the volatile acidic compound 18, 0.40 g of trimethyl borate (trimethoxyborane) [$B(OCH_3)_3$] (boiling point: 68° C., melting point: −34° C.) was placed in the inside of the storage container 17 for a volatile acidic compound (a glass petri dish). These were placed in the inside of the reaction vessel 14 (a glass desiccator), which was then filled with nitrogen as an atmosphere gas. Then, the atmosphere gas was circulated within the reaction vessel 14 by means of the fan 19, and left to stand at the room temperature (25° C.) for 24 hours. Thereby, the surface-treated oxide particles having surfaces coated with the above neutralization product according to Example 7 (NCA particles for a positive-electrode active material of a lithium ion battery) (Li: 7.33 mass %, B: 0.02 mass %, Ni: 49 mass %) were obtained in accordance with the method of manufacturing surface-treated oxide particles according to Example 7.

Note that trimethyl borate (trimethoxyborane) in the inside of the storage container 17 for a volatile acidic compound (a glass petri dish) disappeared completely after being left to stand for 24 hours as described above. Presumably, all of it was consumed for forming the neutralization product on the surfaces of the lithium oxide-rich NCA particles.

[Characterization]

Next, a paste for forming a positive-electrode active-material layer was produced using the surface-treated oxide particles coated with the neutralization product obtained (NCA particles for a positive-electrode active material of a lithium ion battery). The paste was observed not to undergo gelation (pudding formation), but maintain fluidity even after being left to stand for 9 days at room temperature.

Note that the above paste for forming a positive-electrode active-material layer was produced as follows: the surface-treated oxide particles as a positive-electrode active material, acetylene black (AB) as an electroconductive auxiliary agent, poly(vinylidene fluoride) (PVDF) as a binding material (binder), N-methylpyrrolidone (NMP) as an organic solvent were mixed and treated for dispersion in the ratio of oxide particles:AB:PVDF:NMP=44.1:2.3:19.4:32.2:2.0 (mass ratio) (a state where the oxide particles and acetylene black (AB) were dispersed in NMP in which PVDF is dissolved).

Moreover, the positive-electrode capacity was 193 mAh/g (charge cutoff voltage: 4.3 V, discharge cutoff voltage: 3.0 V, rate: 0.05 C) as measured in a coin cell (a positive-electrode active material/an electrolyte solution (a separator)/a negative-electrode active material (a Li foil)) where a positive-electrode active-material layer is used which is obtained by mixing and pressing the surface-treated oxide particle coated with the neutralization product obtained (NCA particles for a positive-electrode active material of a lithium ion battery), acetylene black (AB) as an electroconductive auxiliary agent, polytetrafluoroethylene (PTFE) as a binding material (binder) in the ratio of oxide particles:AB:PTFE=70:20:10 (mass ratio).

Example 8

The surface-treated oxide particles having surfaces coated with the above neutralization product according to Example 8 (NCA particles for a positive-electrode active material of a lithium ion battery) (Li: 7.33 mass %, B: 0.03 mass %, Ni: 49.0 mass %) were obtained in accordance with the method of manufacturing surface-treated oxide particles according to Example 8 performed as in Example 7 except that 200.43 g of the lithium oxide-rich NCA particles of Example 7 were used, and 0.58 g of trimethyl borate (trimethoxyborane [$B(OCH_3)_3$] (boiling point: 68° C., melting point: −34° C.)) was used as the volatile acidic compound 18.

Note that trimethyl borate (trimethoxyborane) in the inside of the storage container 17 for a volatile acidic compound (a glass petri dish) disappeared completely after being left to stand for 24 hours as described above. Presumably, all of it was consumed for forming the neutralization product on the surfaces of the lithium oxide-rich NCA particles.

[Characterization]

Next, a paste for forming a positive-electrode active-material layer was produced as in Example 7 using the surface-treated oxide particles coated with the neutralization product obtained (NCA particles for a positive-electrode active material of a lithium ion battery). The paste was observed not to undergo gelation (pudding formation), but maintain fluidity even after being left to stand for 13 days at room temperature.

In addition, the positive-electrode capacity was 189 mAh/g as measured in a coin cell (a positive-electrode active material/an electrolyte solution (a separator)/a negative-electrode active material (a Li foil)) produced as in Example 7 using the surface-treated oxide particles coated with the neutralization product obtained (NCA particles for a positive-electrode active material of a lithium ion battery).

Example 9

The surface-treated oxide particles having surfaces coated with the above neutralization product according to Example 9 (NCA particles for a positive-electrode active material of a lithium ion battery) (Li: 7.29 mass %, B: 0.07 mass %, Ni: 48.8 mass %) were obtained in accordance with the method of manufacturing surface-treated oxide particles according to Example 9 performed as in Example 7 except that 200.62 g of the lithium oxide-rich NCA particles of Example 7 were used, and 1.36 g of trimethyl borate (trimethoxyborane [B(OCH$_3$)$_3$] (boiling point: 68° C., melting point: −34° C.)) was used as the volatile acidic compound 18.

Note that trimethyl borate (trimethoxyborane) in the inside of the storage container 17 for a volatile acidic compound (a glass petri dish) disappeared completely after being left to stand for 24 hours as described above. Presumably, all of it was consumed for forming the neutralization product on the surfaces of the lithium oxide-rich NCA particles.

[Characterization]

Next, a paste for forming a positive-electrode active-material layer was produced as in Example 7 using the surface-treated oxide particles coated with the neutralization product obtained (NCA particles for a positive-electrode active material of a lithium ion battery). The paste was observed not to undergo gelation (pudding formation), but maintain fluidity even after being left to stand for 6 days at room temperature.

In addition, the positive-electrode capacity was 188 mAh/g as measured in a coin cell (a positive-electrode active material/an electrolyte solution (a separator)/a negative-electrode active material (a Li foil)) produced as in Example 7 using the surface-treated oxide particles coated with the neutralization product obtained (NCA particles for a positive-electrode active material of a lithium ion battery).

Example 10

[Surface Treatment of Oxide Particles]

The surface-treated oxide particles having surfaces coated with the above neutralization product according to Example 10 (NCA particles for a positive-electrode active material of a lithium ion battery) (Li: 7.3 mass %, P: 0.05 mass %, Ni: 48.9 mass %) were obtained in accordance with the method of manufacturing surface-treated oxide particles according to Example 10 performed as in Example 7 except that 202.02 g of the lithium oxide-rich NCA particles of Example 7 were used, and 0.41 g of trimethyl phosphite (trimethoxyphosphine [P(OCH$_3$)$_3$] (boiling point: 111° C., melting point: −75° C.)) was used as the volatile acidic compound 18, and left to stand for 24 hours at the room temperature (25° C.) under nitrogen, and subsequently the atmosphere was changed from nitrogen to dry air (dew point temperature: −60° C.), and then left to stand for 1 hour at the room temperature.

Note that trimethyl phosphite (trimethoxyphosphine) in the inside of the storage container 17 for a volatile acidic compound (a glass petri dish) disappeared completely after being left to stand for 24 hours as described above. Presumably, all of it was consumed for forming the neutralization product on the surfaces of the lithium oxide-rich NCA particles.

[Characterization]

Next, a paste for forming a positive-electrode active-material layer was produced as in Example 7 using the surface-treated oxide particles coated with the neutralization product obtained (NCA particles for a positive-electrode active material of a lithium ion battery). The paste was observed not to undergo gelation (pudding formation), but maintain fluidity even after being left to stand for 12 days at room temperature.

In addition, the positive-electrode capacity was 190 mAh/g as measured in a coin cell (a positive-electrode active material/an electrolyte solution (a separator)/a negative-electrode active material (a Li foil)) produced as in Example 7 using the surface-treated oxide particles coated with the neutralization product obtained (NCA particles for a positive-electrode active material of a lithium ion battery).

Example 11

The surface-treated oxide particles having surfaces coated with the above neutralization product according to Example 11 (NCA particles for a positive-electrode active material of a lithium ion battery) (Li: 7.3 mass %, P: 0.08 mass %, Ni: 48.8 mass %) were obtained in accordance with the method of manufacturing surface-treated oxide particles according to Example 11 performed as in Example 10 except that 201.84 g of the lithium oxide-rich NCA particles of Example 7 were used, and 0.65 g of trimethyl phosphite (trimethoxyphosphine [P(OCH$_3$)$_3$] (boiling point: 111° C., melting point: −75° C.)) was used as the volatile acidic compound 18.

Note that trimethyl phosphite (trimethoxyphosphine) in the inside of the storage container 17 for a volatile acidic compound (a glass petri dish) disappeared completely after being left to stand for 24 hours as described above. Presumably, all of it was consumed for forming the neutralization product on the surfaces of the lithium oxide-rich NCA particles.

[Characterization]

Next, a paste for forming a positive-electrode active-material layer was produced as in Example 7 using the surface-treated oxide particles coated with the neutralization product obtained (NCA particles for a positive-electrode active material of a lithium ion battery). The paste was observed not to undergo gelation (pudding formation), but maintain fluidity even after being left to stand for 7 days at room temperature.

In addition, the positive-electrode capacity was 197 mAh/g as measured in a coin cell (a positive-electrode active material/an electrolyte solution (a separator)/a negative-electrode active material (a Li foil)) produced as in Example 7 using the surface-treated oxide particles coated with the neutralization product obtained (NCA particles for a positive-electrode active material of a lithium ion battery).

Example 12

[Surface Treatment of Oxide Particles]

The surface-treated oxide particles having surfaces coated with the above neutralization product according to Example 12 (NCA particles for a positive-electrode active material of a lithium ion battery) (Li: 7.26 mass %, Si: 0.14 mass %, Ni: 48.7 mass %) were obtained in accordance with the method of manufacturing surface-treated oxide particles according to Example 12 performed as in Example 7 except that 200.26 g of the lithium oxide-rich NCA particles of Example 7 were used, and 2.09 g of tetraethyl orthosilicate (tetraethoxysilane [Si(OC$_2$H$_5$)$_4$] (boiling point: 165° C., melting point: −82° C.)) was used as the volatile acidic compound 18.

Note that tetraethyl orthosilicate (tetraethoxysilane) in the inside of the storage container 17 for a volatile acidic compound (a glass petri dish) disappeared completely after being left to stand for 24 hours as described above. Presumably, all of it was consumed for forming the neutralization product on the surfaces of the lithium oxide-rich NCA particles.

[Characterization]

Next, a paste for forming a positive-electrode active-material layer was produced as in Example 7 using the surface-treated oxide particles coated with the neutralization product obtained (NCA particles for a positive-electrode active material of a lithium ion battery). The paste was observed not to undergo gelation (pudding formation), but maintain fluidity even after being left to stand for 8 days at room temperature.

In addition, the positive-electrode capacity was 195 mAh/g as measured in a coin cell (a positive-electrode active material/an electrolyte solution (a separator)/a negative-electrode active material (a Li foil)) produced as in Example 7 using the surface-treated oxide particles coated with the neutralization product obtained (NCA particles for a positive-electrode active material of a lithium ion battery).

Example 13

The surface-treated oxide particles having surfaces coated with the above neutralization product according to Example 13 (NCA particles for a positive-electrode active material of a lithium ion battery) (Li: 7.25 mass %, Si: 0.24 mass %, Ni: 48.6 mass %) were obtained in accordance with the method of manufacturing surface-treated oxide particles according to Example 13 performed as in Example 7 except that 200.39 g of the lithium oxide-rich NCA particles of Example 7 were used, and 3.63 g of tetraethyl orthosilicate (tetraethoxysilane [$Si(OC_3H_5)_4$] (boiling point: 165° C., melting point: −82° C.)) was used as the volatile acidic compound 18.

Note that tetraethyl orthosilicate (tetraethoxysilane) in the inside of the storage container 17 for a volatile acidic compound (a glass petri dish) disappeared completely after being left to stand for 24 hours as described above. Presumably, all of it was consumed for forming the neutralization product on the surfaces of the lithium oxide-rich NCA particles.

[Characterization]

Next, a paste for forming a positive-electrode active-material layer was produced as in Example 7 using the surface-treated oxide particles coated with the neutralization product obtained (NCA particles for a positive-electrode active material of a lithium ion battery). The paste was observed not to undergo gelation (pudding formation), but maintain fluidity even after being left to stand for 12 days at room temperature.

In addition, the positive-electrode capacity was 192 mAh/g as measured in a coin cell (a positive-electrode active material/an electrolyte solution (a separator)/a negative-electrode active material (a Li foil)) produced as in Example 7 using the surface-treated oxide particles coated with the neutralization product obtained (NCA particles for a positive-electrode active material of a lithium ion battery).

Example 14

[Oxide Particles]

As the oxide particles, used were oxide particles comprising a lithium-nickel-manganese-cobalt oxide ($Li_{1+x}Ni_{0.378}Mn_{0.298}Co_{0.319}Zr_{0.005}O_2$; x=0.07) used for a positive-electrode active material of a lithium ion battery. The above composition contains a lithium oxide ($LiO_{0.5}$) in a 0.07-times excess amount (molar ratio) as compared with the stoichiometric composition ($LiNi_{0.378}Mn_{0.298}Co_{0.319}Zr_{0.005}O_2$), and hereinafter, the above oxide particles are referred to as lithium oxide-rich NMC particles. The lithium oxide contained in an excess amount appears to be solid-dissolved in the NMC particles. Therefore, the excess lithium oxide (an alkaline compound) is assumed to be uniformly distributed over the surfaces of the above lithium oxide-rich NMC particles. Note that the above oxide particles are secondary particles with a particle diameter of 5 to 15 μm comprising primary particles with a particle diameter of 0.3 to 1 μm, in which open pore with a size of 10 nm to several hundreds of nm are present between the primary particles.

[Surface Treatment of Oxide Particles]

As shown in FIG. 5, 201.37 g of ($Li_{1+x}Ni_{0.378}Mn_{0.298}Co_{0.319}Zr_{0.005}O_2$; x=0.07) (mean particle diameter: 6.5 μm, BET specific surface area: 0.9 m$^2$/g) as the oxide particles 16 was placed in the inside of a storage container (a glass petri dish). As the volatile acidic compound 18, 0.78 g of trimethyl borate (trimethoxyborane) [$B(OCH_3)_3$] (boiling point: 68° C., melting point: −34° C.) was placed in the inside of the storage container 17 for a volatile acidic compound (a glass petri dish). These were placed in the inside of the reaction vessel 14 (a glass desiccator), which was then filled with nitrogen as an atmosphere gas. Then, the atmosphere gas was circulated within the reaction vessel 14 by means of the fan 19, and left to stand at the room temperature (25° C.) for 24 hours. Thereby, the surface-treated oxide particles coated with the above neutralization product according to Example 14 (NMC particles for a positive-electrode active material of a lithium ion battery) (Li: 7.55 mass %, B: 0.04 mass %, Ni: 22.3 mass %) in accordance with the method of manufacturing surface-treated oxide particles according to Example 14.

Note that trimethyl borate (trimethoxyborane) in the inside of the storage container 17 for a volatile acidic compound (a glass petri dish) disappeared completely after being left to stand for 24 hours as described above. Presumably, all of it was consumed for forming the neutralization product on the surfaces of the lithium oxide-rich NMC particles.

[Characterization]

Figure 16:
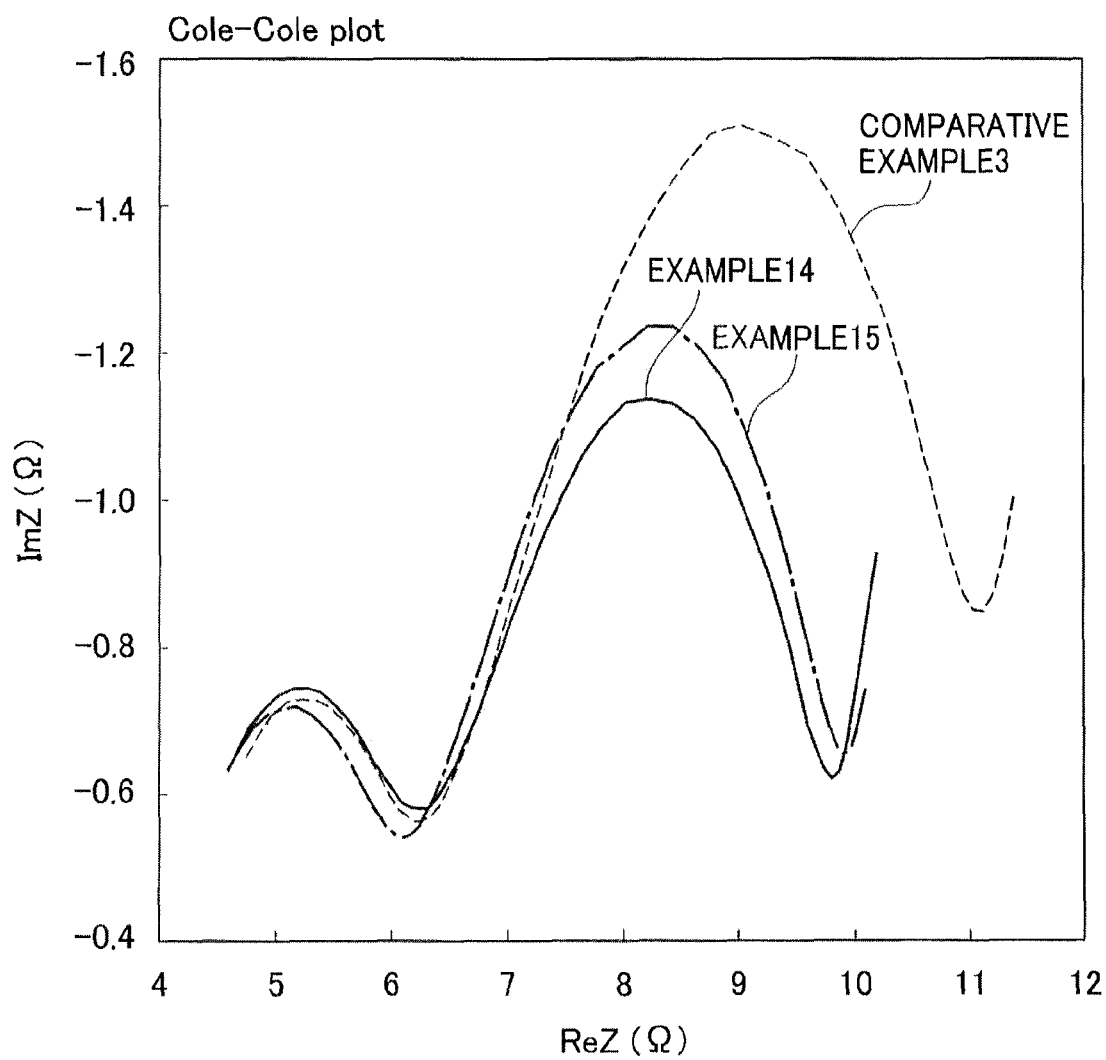
FIG. 16 shows the Cole-Cole plots of Example 14, Example 15 and Comparative Example 3 by the alternating-current impedance method.

Next, a coin cell (a positive-electrode active material/an electrolyte solution (a separator)/a negative-electrode active material (a Li foil)) was produced as in Example 7 using the surface-treated oxide particles coated with the neutralization product obtained (NMC particles as a positive-electrode active material of a lithium ion battery). The positive-electrode resistance was then measured by the alternating-current impedance method to obtain a Cole-Cole plot as shown in FIG. 16. Further, the positive-electrode resistance was read from the bottom position of a semicircle in the side of high resistance in the Cole-Cole plot, which indicates a positive-electrode resistance. The reading was 3.5Ω. Furthermore, the positive-electrode capacity was measured to be 165 mAh/g (charge cutoff voltage: 4.3 V, discharge cutoff voltage: 3.0 V, rate: 0.05 C).

Example 15

The surface-treated oxide particles having surfaces coated with the above neutralization product according to Example 15 (NMC particles for a positive-electrode active material of a lithium ion battery) (Li: 7.56 mass %, B: 0.06 mass %, Ni: 22.4 mass %) were obtained in accordance with the method of manufacturing surface-treated oxide particles according to Example 15 performed as in Example 14 except that 202.94 g of the lithium oxide-rich NMC particles of Example 14 were used, and 1.18 g of trimethyl borate (trimethoxyborane [B(OCH$_3$)$_3$] (boiling point: 68° C., melting point: −34° C.)) was used as the volatile acidic compound 18.

Note that trimethyl borate (trimethoxyborane) in the inside of the storage container 17 for a volatile acidic compound (a glass petri dish) disappeared completely after being left to stand for 24 hours as described above. Presumably, all of it was consumed for forming the neutralization product on the surfaces of the lithium oxide-rich NMC particles.

[Characterization]

Next, a coin cell (a positive-electrode active material/an electrolyte solution (a separator)/a negative-electrode active material (a Li foil)) was produced as in Example 7 using the surface-treated oxide particles coated with the neutralization product obtained (NMC particles for a positive-electrode active material of a lithium ion battery). The positive-electrode resistance was then measured by the alternating-current impedance method to obtain a Cole-Cole plot as shown in FIG. 16. Further, the positive-electrode resistance was read from the bottom position of a semicircle in the side of high resistance in the Cole-Cole plot, which indicates a positive-electrode resistance. The reading was 3.8Ω. Further, the positive-electrode capacity of the coin cell obtained was measured to be 162 mAh/g.

Example 16

[Surface Treatment of Oxide Particles]

The surface-treated oxide particles having surfaces coated with the above neutralization product according to Example 16 (NMC particles for a positive-electrode active material of a lithium ion battery) (Li: 7.55 mass %, P: 0.04 mass %, Ni: 22.3 mass %) were obtained in accordance with the method of manufacturing surface-treated oxide particles according to Example 16 performed as in Example 14 except that 201.15 g of the lithium oxide-rich NMC particles of Example 14 were used, and 0.32 g of trimethyl phosphite (trimethoxyphosphine [P(OCH$_3$)$_3$] (boiling point: 111° C., melting point: −75° C.)) was used as the volatile acidic compound 18, and left to stand for 24 hours at the room temperature (25° C.) under nitrogen, and subsequently the atmosphere was changed from nitrogen to dry air (dew point temperature: −60° C.), and then left to stand for 1 hour at room temperature.

Note that trimethyl phosphite (trimethoxyphosphine) in the inside of the storage container 17 for a volatile acidic compound (a glass petri dish) disappeared completely after being left to stand for 24 hours as described above. Presumably, all of it was consumed for forming the neutralization product on the surfaces of the lithium oxide-rich NMC particles.

[Characterization]

Figure 17:
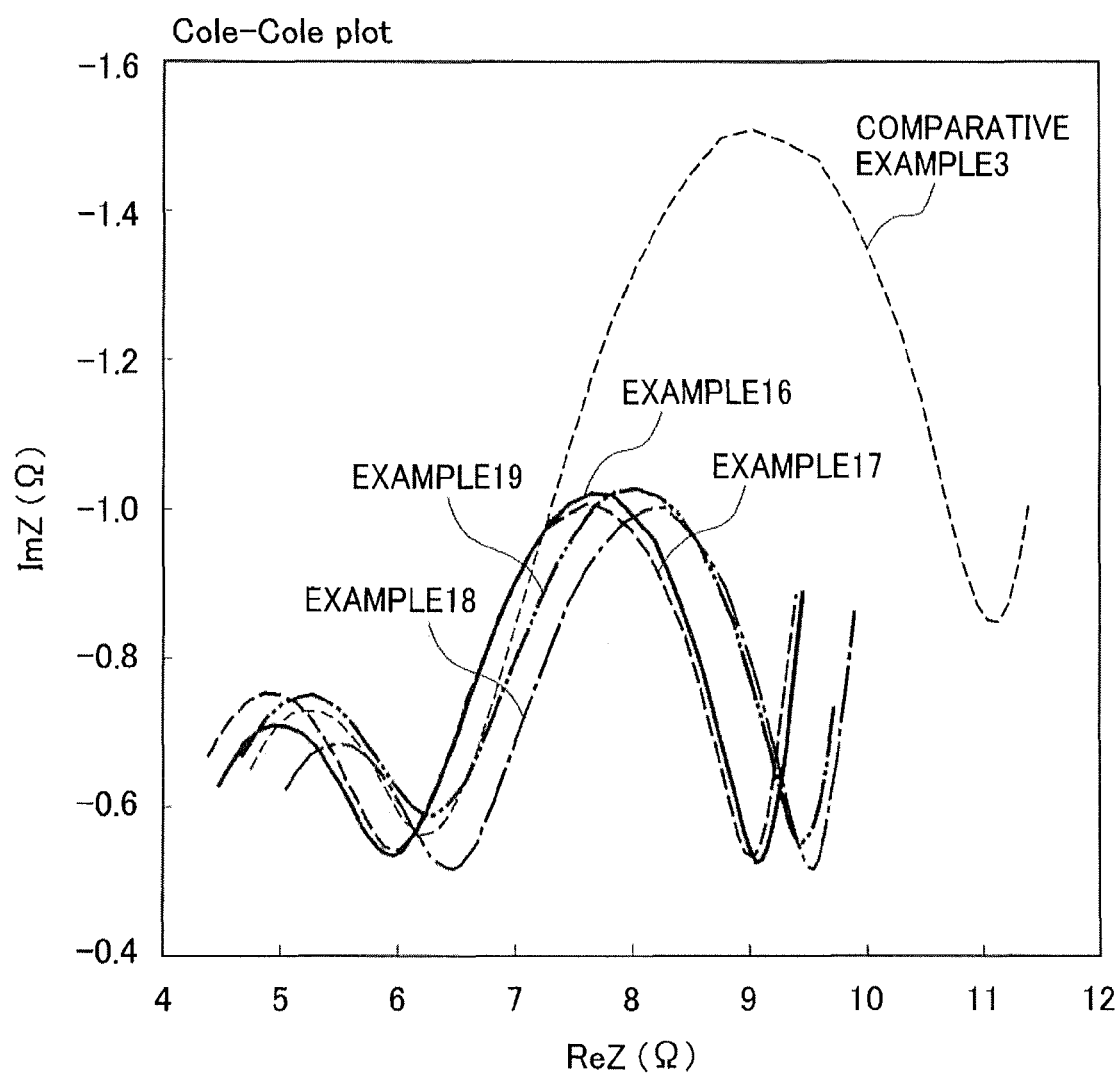
FIG. 17 shows the Cole-Cole plots of Examples 16 to 19 and Comparative Example 3 by the alternating-current impedance method.

Next, a coin cell (a positive-electrode active material/an electrolyte solution (a separator)/a negative-electrode active material (a Li foil)) was produced as in Example 7 using the surface-treated oxide particles coated with the neutralization product obtained (NMC particles as a positive-electrode active material of a lithium ion battery). The positive-electrode resistance was then measured by the alternating-current impedance method to obtain a Cole-Cole plot as shown in FIG. 17. Further, the positive-electrode resistance was read from the bottom position of a semicircle in the side of high resistance in the Cole-Cole plot, which indicates a positive-electrode resistance. The reading was 3.1Ω. Further, the positive-electrode capacity of the coin cell obtained was measured to be 160 mAh/g.

Example 17

The surface-treated oxide particles having surfaces coated with the above neutralization product according to Example 17 (NMC particles for a positive-electrode active material of a lithium ion battery) (Li: 7.54 mass %, P: 0.05 mass %, Ni: 22.3 mass %) were obtained in accordance with the method of manufacturing surface-treated oxide particles according to Example 17 performed as in Example 16 except that 201.86 g of the lithium oxide-rich NNC particles of Example 14 were used, and 0.41 g of trimethyl phosphite (trimethoxyphosphine [P(OCH$_3$)$_3$] (boiling point: 111° C., melting point: −75° C.)) was used as the volatile acidic compound 18.

Note that trimethyl phosphite (trimethoxyphosphine) in the inside of the storage container 17 for a volatile acidic compound (a glass petri dish) disappeared completely after being left to stand for 24 hours as described above. Presumably, all of it was consumed for forming the neutralization product on the surfaces of the lithium oxide-rich NMC particles.

[Characterization]

Next, a coin cell (a positive-electrode active material/an electrolyte solution (a separator)/a negative-electrode active material (a Li foil)) was produced as in Example 7 using the surface-treated oxide particles coated with the neutralization product obtained (NMC particles as a positive-electrode active material of a lithium ion battery). The positive-electrode resistance was then measured by the alternating-current impedance method to obtain a Cole-Cole plot as shown in FIG. 17. Further, the positive-electrode resistance was read from the bottom position of a semicircle in the side of high resistance in the Cole-Cole plot, which indicates a positive-electrode resistance. The reading was 3.1Ω. Further, the positive-electrode capacity of the coin cell obtained was measured to be 159 mAh/g.

Example 18

The surface-treated oxide particles having surfaces coated with the above neutralization product according to Example 18 (NMC particles for a positive-electrode active material of a lithium ion battery) (Li: 7.54 mass %, P: 0.06 mass %, Ni: 22.3 mass %) were obtained in accordance with the method of manufacturing surface-treated oxide particles according to Example 18 performed as in Example 16 except that 201.21 g of the lithium oxide-rich NMC particles of Example 14 were used, and 0.48 g of trimethyl phosphite (trimethoxyphosphine [P(OCH$_3$)$_3$] (boiling point: 111° C., melting point: −75° C.)) was used as the volatile acidic compound 18.

Note that trimethyl phosphite (trimethoxyphosphine) in the inside of the storage container 17 for a volatile acidic compound (a glass petri dish) disappeared completely after being left to stand for 24 hours as described above. Presumably, all of it was consumed for forming the neutralization product on the surfaces of the lithium oxide-rich NMC particles.

[Characterization]

Next, a coin cell (a positive-electrode active material/an electrolyte solution (a separator)/a negative-electrode active material (a Li foil)) was produced as in Example 7 using the surface-treated oxide particles coated with the neutralization product obtained (NMC particles for a positive-electrode active material of a lithium ion battery). The positive-electrode resistance was then measured by the alternating-current impedance method to obtain a Cole-Cole plot as shown in FIG. 17. Further, the positive-electrode resistance was read from the bottom position of a semicircle in the side of high resistance in the Cole-Cole plot, which indicates a positive-electrode resistance. The reading was 3.1 Ω. Further, the positive-electrode capacity of the coin cell obtained was measured to be 160 mAh/g.

Example 19

The surface-treated oxide particles having surfaces coated with the above neutralization product according to Example 19 (NMC particles for a positive-electrode active material of a lithium ion battery) (Li: 7.57 mass %, P: 0.07 mass %, Ni: 22.6 mass %) were obtained in accordance with the method of manufacturing surface-treated oxide particles according to Example 19 performed as in Example 16 except that 201.08 g of the lithium oxide-rich NMC particles of Example 14 were used, and 0.57 g of trimethyl phosphite (trimethoxyphosphine [P(OCH$_3$)$_3$] (boiling point: 111° C., melting point: −75° C.)) was used as the volatile acidic compound 18.

Note that trimethyl phosphite (trimethoxyphosphine) in the inside of the storage container 17 for a volatile acidic compound (a glass petri dish) disappeared completely after being left to stand for 24 hours as described above. Presumably, all of it was consumed for forming the neutralization product on the surfaces of the lithium oxide-rich NMC particles.

[Characterization]

Next, a coin cell (a positive-electrode active material/an electrolyte solution (a separator)/a negative-electrode active material (a Li foil)) was produced as in Example 7 using the surface-treated oxide particles coated with the neutralization product obtained (NMC particles for a positive-electrode active material of a lithium ion battery). The positive-electrode resistance was then measured by the alternating-current impedance method to obtain a Cole-Cole plot as shown in FIG. 17. Further, the positive-electrode resistance was read from the bottom position of a semicircle in the side of high resistance in the Cole-Cole plot, which indicates a positive-electrode resistance. The reading was 3.1Ω. Further, the positive-electrode capacity of the coin cell obtained was measured to be 161 mAh/g.

Example 20

The surface-treated oxide particles having surfaces coated with the above neutralization product according to Example 20 (NMC particles for a positive-electrode active material of a lithium ion battery) (Li: 7.56 mass %, Si: 0.08 mass %, Ni: 22.4 mass %) were obtained in accordance with the method of manufacturing surface-treated oxide particles according to Example 20 performed as in Example 14 except that 201.70 g of the lithium oxide-rich NMC particles of Example 14 were used, and 1.20 g of tetraethyl orthosilicate (tetraethoxysilane [Si(OC$_2$H$_5$)$_4$] (boiling point: 165° C., melting point: −82° C.)) was used as the volatile acidic compound 18.

Note that tetraethyl orthosilicate (tetraethoxysilane) in the inside of the storage container 17 for a volatile acidic compound (a glass petri dish) disappeared completely after being left to stand for 24 hours as described above. Presumably, all of it was consumed for forming the neutralization product on the surfaces of the lithium oxide-rich NMC particles.

[Characterization]

Figure 18:
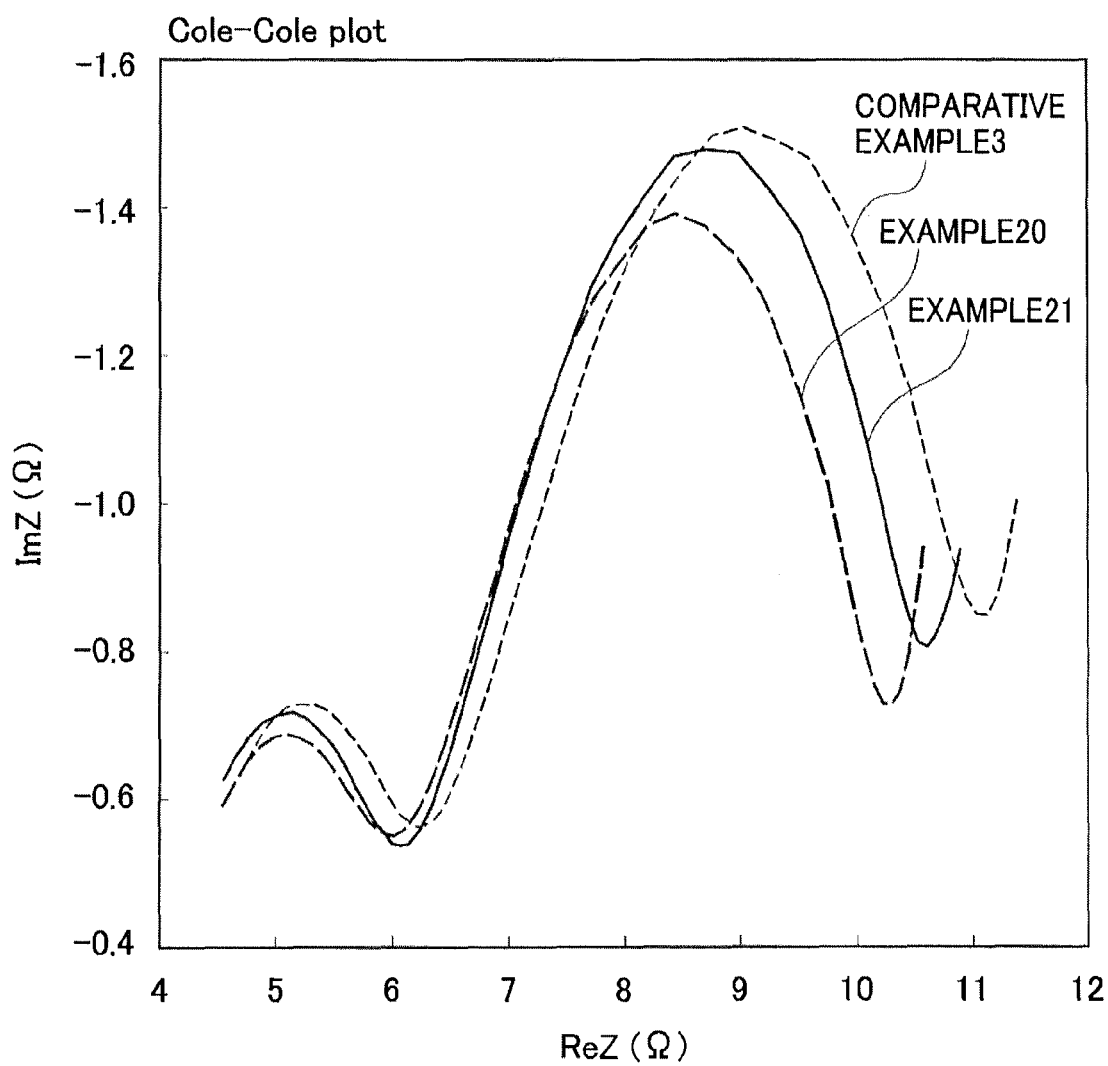
FIG. 18 shows the Cole-Cole plots of Example 20, Example 21 and Comparative Example 3 by the alternating-current impedance method.

Next, a coin cell (a positive-electrode active material/an electrolyte solution (a separator)/a negative-electrode active material (a Li foil)) was produced as in Example 7 using the surface-treated oxide particles coated with the neutralization product obtained (NMC particles for a positive-electrode active material of a lithium ion battery). The positive-electrode resistance was then measured by the alternating-current impedance method to obtain a Cole-Cole plot as shown in FIG. 18. Further, the positive-electrode resistance was read from the bottom position of a semicircle in the side of high resistance in the Cole-Cole plot, which indicates a positive-electrode resistance. The reading was 4.2Ω. Further, the positive-electrode capacity of the coin cell obtained was measured to be 160 mAh/g.

Example 21

The surface-treated oxide particles having surfaces coated with the above neutralization product according to Example 21 (NMC particles for a positive-electrode active material of a lithium ion battery) (Li: 7.56 mass %, Si: 0.10 mass %, Ni: 22.4 mass %) were obtained in accordance with the method of manufacturing surface-treated oxide particles according to Example 21 performed as in Example 20 except that 201.63 g of the lithium oxide-rich NMC particles of Example 14 were used, and 1.50 g of tetraethyl orthosilicate (tetraethoxysilane [Si(OC$_2$H$_5$)$_4$] (boiling point: 165° C., melting point: −82° C.)) was used as the volatile acidic compound 18.

Note that tetraethyl orthosilicate (tetraethoxysilane) in the inside of the storage container 17 for a volatile acidic compound (a glass petri dish) disappeared completely after being left to stand for 24 hours as described above. Presumably, all of it was consumed for forming the neutralization product on the surfaces of the lithium oxide-rich NMC particles.

[Characterization]

Next, a coin cell (a positive-electrode active material/an electrolyte solution (a separator)/a negative-electrode active material (a Li foil)) was produced as in Example 7 using the surface-treated oxide particles coated with the neutralization product obtained (NMC particles for a positive-electrode active material of a lithium ion battery). The positive-electrode resistance was then measured by the alternating-current impedance method to obtain a Cole-Cole plot as shown in FIG. 18. Further, the positive-electrode resistance was read from the bottom position of a semicircle in the side of high resistance in the Cole-Cole plot, which indicates the positive-electrode resistance. The reading was 4.5Ω. Further, the positive-electrode capacity of the coin cell obtained was measured to be 160 mAh/g.

Comparative Example 1

The oxide particles in which their surfaces were not coated with a neutralization product according to Comparative Example 1 (NCA particles for a positive-electrode active material of a lithium ion battery) were obtained by heat-treating the lithium oxide-rich NCA particles of Example 1 as the oxide particles 16 at 150° C. for 30 minutes under dry air (dew point temperature: −60° C.) without performing surface treatment of the oxide particles in Example 1.

[Characterization]

Next, a paste for forming a positive-electrode active-material layer was produced as in Example 1 using the oxide particles without surface treatment obtained (NCA particles for a positive-electrode active material of a lithium ion battery). It was observed that the paste had already undergone gelation (pudding formation) and lost fluidity before the end of 8-hour left-standing at room temperature.

Note that the positive-electrode capacity was 194 mAh/g (rate: 0.05 C) as measured in a coin cell (a positive-electrode active material/an electrolyte solution (a separator)/a negative-electrode active material (a Li foil)) where the positive-electrode active-material layer obtained by applying, drying and pressing the above paste for forming a positive-electrode active-material layer was used before undergoing gelation (pudding formation).

Comparative Example 2

The lithium oxide-rich NCA particles of Example 7 as the oxide particles without subjected to surface treatment of the oxide particles in Example 7 were used as oxide particles in which their surfaces were not coated with a neutralization product according to Comparative Example 2 (NCA particles for a positive-electrode active material of a lithium ion battery) (Li: 7.40 mass %, B: less than 0.01 mass %, Ni: 49.0 mass %).

[Characterization]

Next, a paste for forming a positive-electrode active-material layer was produced as in Example 7 using the oxide particles without surface treatment (NCA particles for a positive-electrode active material of a lithium ion battery). It was observed that the paste had already undergone gelation (pudding formation) and lost fluidity before the end of 2-day left-standing at room temperature.

Note that the positive-electrode capacity was 195 mAh/g as measured in a coin cell (a positive-electrode active material/an electrolyte solution (a separator)/a negative-electrode active material (a Li foil)) produced as in Example 7 using the oxide particles without surface treatment (NCA particles for a positive-electrode active material of a lithium ion battery).

Comparative Example 3

The lithium oxide-rich NMC particles of Example 14 as the oxide particles 16 without subjected to surface treatment of the oxide particles in Example 14 were used as oxide particles in which their surfaces were not coated with a neutralization product according to Comparative Example 3 (NMC particles for a positive-electrode active material of a lithium ion battery) (Li: 7.58 mass %, B: less than 0.01 mass %, P: less than 0.01 mass %, Si: less than 0.02 mass %, Ni: 22.4 mass %).

[Characterization]

Next, a coin cell (a positive-electrode active material/an electrolyte solution (a separator)/a negative-electrode active material (a Li foil)) was produced as in Example 7 using the oxide particles without surface treatment (NMC particles for a positive-electrode active material of a lithium ion battery). The positive-electrode resistance was then measured by the alternating-current impedance method to obtain Cole-Cole plots as shown in FIGS. 16 to 18. Further, the positive-electrode resistance was read from the bottom position of a semicircle in the side of high resistance in the Cole-Cole plot, which indicates a positive-electrode resistance. The reading was 4.8Ω. Further, the positive-electrode capacity of the coin cell obtained was measured to be 163 mAh/g.

When Examples 1 to 13 and Comparative Examples 1 and 2, in each of which lithium oxide-rich NCA particles were used as oxide particles, and had a similar positive-electrode capacity (194 to 197 mAh/g (rate: 0.05 C)), were compared, the following were revealed. In each of Examples where surface treatment was performed by the gas phase process, the resulting paste for forming a positive-electrode active-material layer did not undergo gelation (pudding formation), but maintained fluidity even after being left for stand for 4 days or more. In contrast, in the case of Comparative Example 1 where surface treatment was not performed by the gas phase process, the paste had already undergone gelation (pudding formation) and lost fluidity before the end of 8-hour left-standing at room temperature. In the case of Comparative Example 2, the paste had already undergone gelation (pudding formation) and lost fluidity before the end of 2-day left-standing. The reason of this could be explained as follows. In the surface-treated oxide particles according to the present invention, the elution of an alkali component from the oxide particles into a paste for forming a positive-electrode active-material layer is prevented by surface treatment. Therefore, PVDF as a binding material (binder) in the paste does not easily undergo polymerization due to the alkali component, which can prevent gelation.

[Evaluation of Moisture Resistance for Example 8, Example 11, Example 13 and Comparative Example 2]

Figure 14:
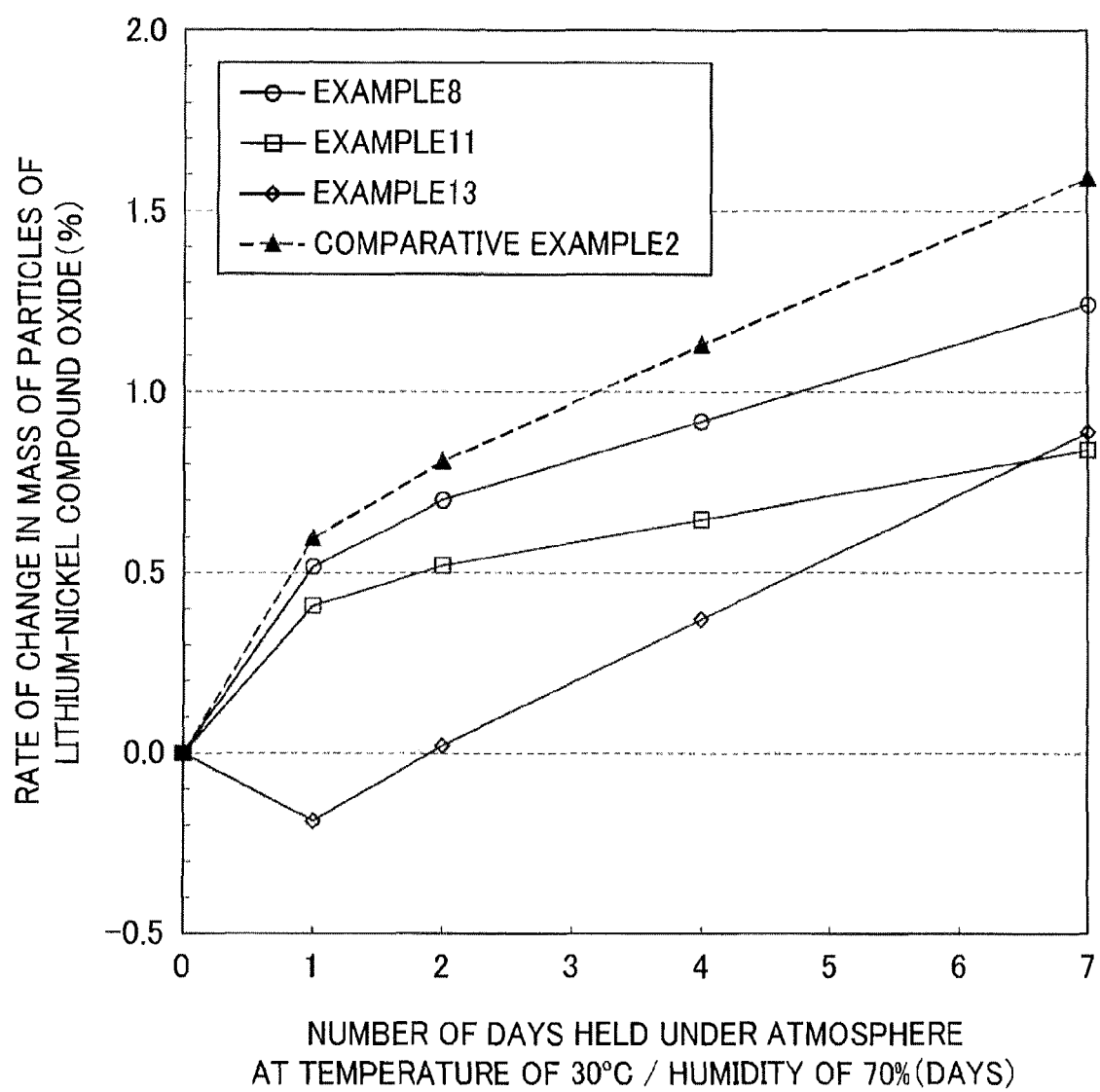
FIG. 14 shows the evaluation of Example 8, Example 11, Example 13 and Comparative Example 2 for moisture resistance (the rate of mass change when surface-treated oxide particles (particles of a lithium-nickel composite oxide) were maintained in a temperature/humidity chamber at a temperature of 30° C. and a humidity of 70%).

Moisture resistance was evaluated for the surface-treated oxide particles according to Example 8, Example 11 and Example 13 (lithium-nickel composite oxide particles with a coating) and the oxide particles without surface treatment according to Comparative Example 2 (lithium-nickel composite oxide particles without a coating). FIG. 14 shows the change in mass when 2 g of the oxide particles (lithium-nickel composite oxide particles) were placed in a glass bottle, and maintained in a temperature/humidity chamber at a temperature of 30° C./a humidity of 70%.

The surface-treated oxide particles according to each of Examples (Example 8, Example 11, Example 13) (lithium-nickel composite oxide particles with a coating) each showed a smaller mass change rate than the oxide particles without surface treatment according to Comparative Example 2 (lithium-nickel composite oxide particles without a coating), demonstrating that moisture resistance can be improved by the surface treatment (coating treatment).

[Evaluation of Battery Cycle Characteristics for Example 8, Example 11, Example 13 and Comparative Example 2]

Figure 15:
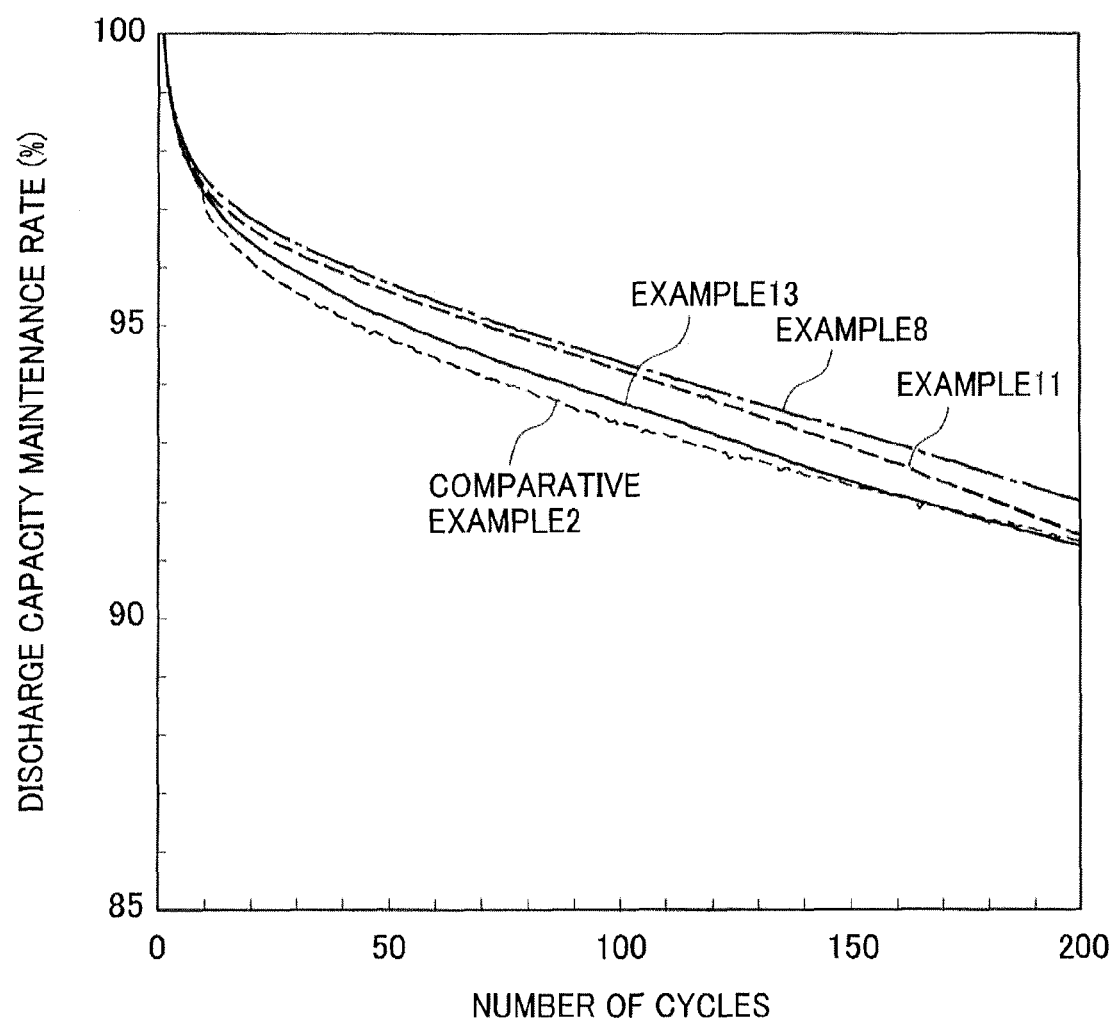
FIG. 15 shows the discharge capacity maintenance rates (%) of Example 8, Example 11, Example 13 and Comparative Example 2.

Cycle characteristics were evaluated for coin cells produced using the surface-treated oxide particles according to Example 8, Example 11 and Example 13 (lithium-nickel composite oxide particles with a coating) and the oxide particles without surface treatment according to Comparative Example 2 (lithium-nickel composite oxide particles without a coating). A positive electrode was produced by mixing and pressing lithium-nickel composite oxide particles, acetylene black and polytetra ethylene fluoride (PTFE) in the mass ratio of 70:20:10, and performing heated-vacuum dry at 120° C. Graphite was used for a negative electrode, and a mixed solution of ethylene carbonate (EC) and diethyl carbonate (DEC) in which 1 M $LiPF_6$ was used as a supporting electrolyte was used as an electrolyte solution. The discharge capacity maintenance rate was measured when 200 cycles of charge and discharge were performed in which discharge was performed to a cutoff voltage of 3.0 V after charging to a cutoff voltage of 4.3 V at a C rate of charge and discharge of 1 C. The change in the discharge capacity maintenance rate as a function of the number of cycles is shown in FIG. 15. The measurement results showed that 92.0% in Example 8, 91.4% in Example 11, 91.2% in Example 13, and 91.3% in Comparative Example 2.

The coin cell in which the surface-treated oxide particles according to each of Examples (Example 8, Example 11, Example 13) (lithium-nickel composite oxide particles with a coating) were used for a positive electrode was capable of showing a discharge capacity maintenance rate comparable to the coin cell in which the oxide particles without surface treatment according to Comparative Example 2 (lithium-nickel composite oxide particles without a coating) were used for a positive electrode. This indicates that cycle characteristics are not affected even in a case where surface treatment is performed.

Further, the Cole-Cole plot in a case where the surface-treated oxide particles according to each of Examples (Examples 14 to 21) shown in FIGS. 15 to 18 (ternary particles for a positive-electrode active material of a lithium ion battery) were used for a positive electrode shows a smaller semicircle in the side of high resistance which corresponds to the positive electrode resistance than the Cole-Cole plot in a case where the oxide particles without surface treatment according to Comparative Example 3 (ternary particles for a positive-electrode active material of a lithium ion battery) were used for a positive electrode. This indicates decreased interface resistance. Moreover, the positive electrode resistance (Q) read from the bottom location of a semicircle in the side of high resistance which corresponds to the positive electrode resistance is also decreased. These reveal that the surface-treated oxide particles, which are capable of showing reduced interface resistance, are suitable for an active-material layer of an electrolyte solution-based secondary battery or an all-solid secondary battery, and can significantly contribute to improved characteristics.

INDUSTRIAL APPLICABILITY

The method of manufacturing surface-treated oxide particles according to the present invention can allow a dense and uniform surface-treatment layer in the nano order to be formed by a simple way using the gas phase process. Therefore, high-performance oxide particles can be manufacturing at low cost. Further, the oxide particles obtained by the present method are effective for suppressing gelation of a paste for forming active-material layer of an electrolyte solution-based secondary battery (an active-material paste), and for reducing the interface resistance of active-material particles/a sulfide-based solid electrolyte of a sulfide-based all-solid secondary battery. Therefore, they can significantly contribute to provision of a low-cost secondary battery with improved characteristics when used for an active-material layer (a positive electrode, a negative electrode) of an electrolyte solution-based secondary battery or an all-solid secondary battery.

EXPLANATION OF REFERENCE NUMERALS

1 Positive-electrode current collector
2 Positive-electrode active-material layer
3 Separator
4 Electrolyte solution
5 Negative-electrode active-material layer
6 Negative-electrode current collector
7 Electrode lead (Extraction electrode)
8 Container
9 Solid electrolyte layer
10 Primary particles of oxide particles
11 Oxide particles (Secondary Particles) configured such that primary particles are assembled in an agglomerative form
12 Open pore between primary particles of oxide particles
13*a* Coating layer
13*b* Surface treatment layer
14 Reaction vessel
15 Storage container for oxide particles
16 Oxide particles
17 Storage container for volatile acidic compound
18 Volatile acidic compound
19 Fan (for circulating atmosphere gas, or for flowing atmosphere gas)
20 Impeller (for stirring oxide particles)
21 Volatilization chamber

The invention claimed is:

1. A method of manufacturing surface-treated oxide particles, the oxide particles each comprising a secondary particle formed with primary particles, and a neutralization product being formed on a surface of the secondary particle and on a surface exposed to the side of an open pore between the primary particles, the surface exposed to the side of an open pore between the primary particles being a portion of surfaces of the primary particles inside the secondary particle, the method comprising:

contacting oxide particles having an alkaline compound on the particle surface with a gas comprising a volatile acidic compound, and forming the neutralization product by a reaction of the alkaline compound with the acidic compound in the gas phase, wherein the alkaline compound is any one or more selected from the group of compounds containing lithium (Li), sodium (Na), and magnesium (Mg), and the volatile acidic compound is any one or more selected from the group of compounds containing boron (B), phosphorus (P), and silicon (Si), and the oxide particles are of an alkali composite oxide comprising any one or more transition metals selected from the group of manganese, cobalt, nickel, iron, titanium, and comprising any one or more alkali elements selected from the group of lithium (Li), sodium (Na), and magnesium (Mg).

2. The method of manufacturing surface-treated oxide particles according to claim 1, wherein the volatile acidic compound contains boron (B), and the content of boron (B) relative to the surface-treated oxide particles is 0.01 mass % or more and 0.10 mass % or less.

3. The method of manufacturing surface-treated oxide particles according to claim 2, wherein the oxide particles having an alkaline compound on particle surfaces are oxide particles having some or all of particle surfaces coated with an alkali component, and the alkali component is any one or more selected from the group of hydroxides, carbonates, oxides of lithium (Li), sodium (Na), and magnesium (Mg).

4. The method of manufacturing surface-treated oxide particles according to claim 1, wherein the volatile acidic compound contains phosphorus (P), and the content of phosphorus (P) relative to the surface-treated oxide particles is 0.01 mass % or more and 0.10 mass % or less.

5. The method of manufacturing surface-treated oxide particles according to claim 4, wherein the oxide particles having an alkaline compound on particle surfaces are oxide particles having some or all of particle surfaces coated with an alkali component, and the alkali component is any one or more selected from the group of hydroxides, carbonates, oxides of lithium (Li), sodium (Na), and magnesium (Mg).

6. The method of manufacturing surface-treated oxide particles according to claim 1, wherein the volatile acidic compound contains silicon (Si), and the content of silicon (Si) relative to the surface-treated oxide particles is 0.05 mass % or more and 0.30 mass % or less.

7. The method of manufacturing surface-treated oxide particles according to claim 6, wherein the oxide particles having an alkaline compound on particle surfaces are oxide particles having some or all of particle surfaces coated with an alkali component, and the alkali component is any one or more selected from the group of hydroxides, carbonates, oxides of lithium (Li), sodium (Na), and magnesium (Mg).

8. The method of manufacturing surface-treated oxide particles according to claim 1, wherein the oxide particles having an alkaline compound on particle surfaces are oxide particles having some or all of particle surfaces coated with an alkali component, and the alkali component is any one or more selected from the group of hydroxides, carbonates, oxides of lithium (Li), sodium (Na), and magnesium (Mg).

9. The method of manufacturing surface-treated oxide particles according to claim 8, wherein the alkali component is any one or more selected from the group of lithium hydroxide (LiOH), lithium carbonate ($Li_2CO_3$), and lithium oxide ($Li_2O$).

10. The method of manufacturing surface-treated oxide particles according to claim 1, wherein the alkaline compound is the alkali composite oxide, the alkali composite oxide containing any one or more alkali oxides selected from the group of oxides of lithium (Li), sodium (Na), and magnesium (Mg) in an excess amount as compared with a stoichiometric composition.

11. The method of manufacturing surface-treated oxide particles according to claim 1, wherein the volatile acidic compound is any one or more selected from the group of boric acid compounds, phosphoric acid compounds, phosphorous acid compounds, and silicic acid compounds each having a boiling point of 300° C. or less.

12. The method of manufacturing surface-treated oxide particles according to claim 11, wherein the volatile acidic compound is any one or more selected from the group of alkylboric acid, alkylphosphoric acid, alkylphosphorous acid, and alkylsilicic acid each having a boiling point of 250° C. or less.

13. The method of manufacturing surface-treated oxide particles according to claim 1, comprising: performing heat treatment at 100° C. or more after forming the neutralization product.

14. The method of manufacturing surface-treated oxide particles according to claim 1, wherein the neutralization product is any one or more selected from the group of lithium boron oxides, lithium phosphorus oxides, and lithium silicon oxides.

15. The method of manufacturing surface-treated oxide particles according to claim 1, wherein the alkali composite oxide comprises, as a main component, any one or more selected from the group of $LiMO_2$, $LiMPO_4$, $Li_2MSiO_4$ (M: any one or more transition metals selected from the group of manganese, cobalt, nickel, iron), $LiY_aMn_{2-a}O_4$ (Y: cobalt, nickel; $0 \leq a \leq 1$), $Li_2MnO_3$—$LiMO_2$ (M: any one or more transition metals selected from the group of manganese, cobalt, and nickel), and $Li_4Ti_5O_{12}$.

* * * * *